United States Patent
Suzuki

(10) Patent No.: US 6,990,057 B2
(45) Date of Patent: *Jan. 24, 2006

(54) DISC RECORDING/REPRODUCING DEVICE AND DISC RECORDING/REPRODUCING METHOD

(75) Inventor: Yuichi Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/082,916

(22) Filed: Mar. 18, 2005

(65) Prior Publication Data

US 2005/0163005 A1   Jul. 28, 2005

Related U.S. Application Data

(63) Continuation of application No. 10/478,213, filed as application No. PCT/JP02/13697 on Dec. 26, 2002, now Pat. No. 6,912,191.

(30) Foreign Application Priority Data

Mar. 29, 2002   (JP) .............................. 2002-98047

(51) Int. Cl.
G11B 7/00   (2006.01)
(52) U.S. Cl. .............................. 369/59.25; 369/275.3; 369/47.27
(58) Field of Classification Search ............. 369/275.3, 369/47.27, 59.25, 47.3, 59.23, 47.24

See application file for complete search history.

(56) References Cited

U.S. PATENT DOCUMENTS 6,115,340 A   9/2000   Van Den Enden et al.

FOREIGN PATENT DOCUMENTS

| EP | 507341 | 10/1992 |
|----|--------|---------|
| EP | 613136 | 8/1994 |
| JP | 63-91880 | 4/1988 |
| JP | 11-120707 | 4/1999 |
| JP | 2001-43635 | 2/2001 |
| JP | 2002-15549 | 1/2002 |

Primary Examiner—Nabil Hindi
(74) Attorney, Agent, or Firm—Oblon, Spivak, McClelland, Maier & Neustadt, P.C.

(57) ABSTRACT

In a disc drive device (10) described as a specific embodiment of the present invention, AC0 to AC14 of ADIP cluster address are associated with address bits AU6 to AU20 of an address unit. On the basis of 8-bit sector address on the lower side of cluster address arranged in ADIP address of a conventional MD, 0/1 representing sector address FC to 0D of a former-half cluster and sector address 0E to 1F of a latter-half cluster of a sector of a next-generation MD(1) is associated with address bit AU5 of the address unit. To a part (110) of 4 address bits AU4 to AU1 below this, 4 bits representing individual parts obtained by equally dividing one recording block by 16 are allocated. Thus, a higher-density data volume can be handled without causing any inconvenience while utilizing an existing recording format.

3 Claims, 20 Drawing Sheets

|  | MINI DISC (MD DATA) | NEXT-GENERATION MD1 | NEXT-GENERATION MD2 |
|---|---|---|---|
| TRACK PITCH | 1.6 μm | 1.3 μm | 1.25 μm |
| PIT LENGTH | 0.59 μm/bit | 0.44 μm/bit | 0.16 μm/bit |
| λ·NA | 780nm·0.45 | 780nm·0.45 | 780nm·0.45 |
| RECORDING SYSTEM | GROOVE RECORDING | GROOVE RECORDING | GROOVE RECORDING + DWDD |
| ADDRESS SYSTEM | SINGLE-SPIRAL DOUBLE-SIDE WOBBLE | SINGLE-SPIRAL DOUBLE-SIDE WOBBLE | SINGLE-SPIRAL DOUBLE-SIDE WOBBLE |
| MODULATION SYSTEM | EFM | 1-7PP | 1-7PP |
| ERROR CORRECTING SYSTEM | ACIRC | LDC+BIS | LDC+BIS |
| INTERLEAVE | CONVOLUTION | BLOCK-COMPLETION | BLOCK-COMPLETION |
| REDUNDANCY | 46.3% | 20.50% | 20.50% |
| DETECTING SYSTEM | bit by bit | PR(1,2,1)ML | PR(1,-1)ML |
| LINEAR VELOCITY | 1.2m/s | 2.4m/s | 2.0m/s |
| DATA RATE | 133KB/s | 4.4Mbit/s | 9.8Mbit/s |
| TOTAL CAPACITY | 164MB(140MB) | 300MB | 1GB |
| CLUSTER STRUCTURE (MINIMUM REWRITING UNIT) | 32 SECTORS + 4 LINK SECTORS | 16 SECTORS | 16 SECTORS |

UMD3

| Sync 4bit | ClusterH 4bit | ClusterM 8bit | ClusterL 4bit | Sector 4bit | BCH code parity 18bit |
|---|---|---|---|---|---|
| 0  3 | 4  7 | 8  15 | 16  19 | 20  23 | 24  41 |

FIG.10B

UMD1

| Sync 4bit | ClusterH 8bit | ClusterL 8bit | Sector 8bit | BCH code parity 14bit |
|---|---|---|---|---|
| 0  3 | 4  11 | 12  19 | 20  27 | 28  41 |

| Sync 4bit | ClusterH 8bit | ClusterL 8bit | Sector 4bit | BCH code parity 18bit |

FIG.11

DISC RECORDING/REPRODUCING DEVICE AND DISC RECORDING/REPRODUCING METHOD

CROSS-REFERENCE TO RELATED APPLICATIONS

This application is a continuation of and claims the benefit of priority under 35 USC §120 from U.S. application Ser. No. 10/478,213, Nov. 28, 2003 and claims the benefit of priority under 35 USC §119 from Japanese Patent Application No. P2002-098047, filed on Mar. 29, 2002, the entire contents of which are incorporated herein by reference.

TECHNICAL FIELD

This invention relates to a disc recording/reproducing device and a disc recording/reproducing method.

This application claims priority of Japanese Patent Application No. 2002-098047, filed on Mar. 29, 2002, the entirety of which is incorporated by reference herein.

BACKGROUND ART

As recording media for recording various types of software such as video data, audio data, or data for computers, recording media such as magnetic disks, optical discs and magneto-optical discs have been popularized. For these recording media, various formats are prescribed by predetermined standards.

In recent years, the advancement of the high-efficiency coding technique has enabled band compression of all kinds of data including video data so that these data are handled as digital data. Along with this, increase in capacity of recording media and improvement in recording density are demanded. As techniques for realizing a higher density of recording data, narrowing of the track pitch, change of the linear velocity, change of the modulation system and the like may be considered.

However, in the case of increasing the recording capacity by changing the recording density of an existing recording medium, the address management method on the disc differs depending on the recording format.

For example, with an existing magneto-optical disc, in the case of recording data at a high density using a different recording format, the quantity of recording data increases and therefore a problem arises that clusters/sectors represented by ADIP (address in pre-groove) addresses recorded in advance on grooves of the magneto-optical disc do not coincide with data blocks, which are actually handled as recording/reproducing units.

Random access is carried out with reference to ADIP address. When reading out data in random access, it is possible to read out desired recorded data by accessing a part near the position where the desired data is recorded. However, when writing data, it is necessary to access an accurate position in order not to overwrite and erase already recorded data. Therefore, it is important to accurately grasp the access position from the cluster/sector of each data block unit associated with ADIP address.

DISCLOSURE OF THE INVENTION

It is an object of the present invention to provide a disc recording/reproducing device and a disc recording reproducing method that enable handling of the data volume with a higher density without causing any inconvenience while utilizing the existing recording formats, in the case of recording data onto a recording medium using plural recording formats.

A disc recording/reproducing device according to the present invention is adapted for, with respect to a disc on which a unit cluster having a predetermined number 2N (where N is a positive integer) of sectors as a set is formed and on which a sector address corresponding to each sector and a cluster address corresponding each cluster are modulated in a predetermined manner and recorded in advance, performing recording and reproduction using N sectors as a unit, which is obtained by bisecting the unit cluster. The disc recording/reproducing device includes: reproduction means for reproducing the cluster address and the sector address modulated in the predetermined manner and recorded in advance, from the disc; identifier generation means for generating an identifier that identifies the former N sectors or the latter N sectors obtained by bisecting the cluster unit, as a recording unit used for recording data; recording means for blocking inputted data into plural blocks and recording the blocked data within the N-sector recording unit; address generation means for generating an address corresponding to the plural blocks each that are formed in the N-sector recording unit; and conversion means for converting the cluster address and the sector address reproduced by the reproducing means to an address unit including the identifier generated by the identifier generation means, the address generated by the address generation means and a recording block address generated on the basis of the cluster address; the address unit obtained by conversion by the conversion means being recorded for the plural blocks each, by the recording means.

This disc recording/reproducing device further includes generation means for generating an identifier that identifies a recording area when the disc has plural recording areas, and the identifier generated by the generation means is added to the address unit by the conversion means and thus recorded. Moreover, in this disc recording/reproducing device, the identifier generated by the generation means has a fixed value when the disc has a single recording area.

Another disc recording/reproducing device according to the present invention is adapted for, with respect to a disc on which a unit cluster having a predetermined number 2N (where N is a positive integer) of sectors added to a linking sector longer than an interleave length as a set is formed and on which a sector address corresponding to each sector and a cluster address corresponding each cluster are modulated in a predetermined manner and recorded in advance, performing recording and reproduction using N sectors as a unit, which is obtained by bisecting the unit cluster. The disc recording/reproducing device includes: reproduction means for reproducing the cluster address and the sector address modulated in the predetermined manner and recorded in advance, from the disc; recording means for blocking inputted data into plural blocks and recording the blocked data within the N-sector recording unit; address generation means for generating an address corresponding to the plural blocks each that are formed in the N-sector recording unit; and conversion means for converting the cluster address and the sector address reproduced by the reproducing means to an address unit including the address generated by the address generation means and a recording block address generated on the basis of the cluster address; the address unit obtained by conversion by the conversion means being recorded for the plural blocks each, by the recording means.

This disc recording/reproducing device further includes generation means for generating an identifier that identifies a recording area when the disc has plural recording areas, and the identifier generated by the generation means is added to the address unit by the conversion means and thus recorded. Moreover, in this disc recording/reproducing device, the identifier generated by the generation means has a fixed value when the disc has a single recording area.

A disc recording/reproducing method according to the present invention is adapted for, with respect to a disc on which a unit cluster having a predetermined number 2N (where N is a positive integer) of sectors as a set is formed and on which a sector address corresponding to each sector and a cluster address corresponding each cluster are modulated in a predetermined manner and recorded in advance, performing recording and reproduction using N sectors as a unit, which is obtained by bisecting the unit cluster. The disc recording/reproducing method includes: a step of reproducing the cluster address and the sector address modulated in the predetermined manner and recorded in advance, from the disc; a step of generating an identifier that identifies the former N sectors or the latter N sectors obtained by bisecting the cluster unit, as a recording unit used for recording data; a step of generating an address corresponding to the plural blocks each that are formed in the N-sector recording unit; a step of converting the reproduced cluster address and sector address to an address unit including the generated identifier, the generated address and a recording block address generated on the basis of the cluster address; and a step of blocking inputted data into plural blocks, then recording the blocked data in the N-sector recording unit, and recording the address unit obtained by the conversion for the plural blocks each.

Another disc recording/reproducing method according to the present invention is adapted for, with respect to a disc on which a unit cluster having a predetermined number 2N (where N is a positive integer) of sectors added to a linking sector longer than an interleave length as a set is formed and on which a sector address corresponding to each sector and a cluster address corresponding each cluster are modulated in a predetermined manner and recorded in advance, performing recording and reproduction using N sectors as a unit, which is obtained by bisecting the unit cluster. The disc recording/reproducing method includes: a step of reproducing the cluster address and the sector address modulated in the predetermined manner and recorded in advance, from the disc; a step of generating an address corresponding to the plural blocks each that are formed in the N-sector recording unit; a step of converting the reproduced cluster address and sector address to an address unit including the generated address and a recording block address generated on the basis of the cluster address; and a step of blocking inputted data into plural blocks, then recording the blocked data within the N-sector recording unit, and recording the address unit obtained by the conversion for the plural blocks each.

The other objects of the present invention and specific advantages provided by the present invention will be further clarified from the following description of embodiments.

BRIEF DESCRIPTION OF THE DRAWINGS

FIG. 1 is a view for explaining the specifications of a next-generation MD1 and a next-generation MD2 described as specific examples of the present invention, and a conventional mini disc.

FIG. 10A is a schematic view showing the ADIP data structure of the next-generation MD2. FIG. 10B is a schematic view showing the ADIP data structure of the next-generation MD1.

FIG. 11 is a schematic view for explaining a modification of the data management structure of the next-generation MD2 described as a specific example of the present invention.

BEST MODE FOR CARRYING OUT THE INVENTION

Figure 2:
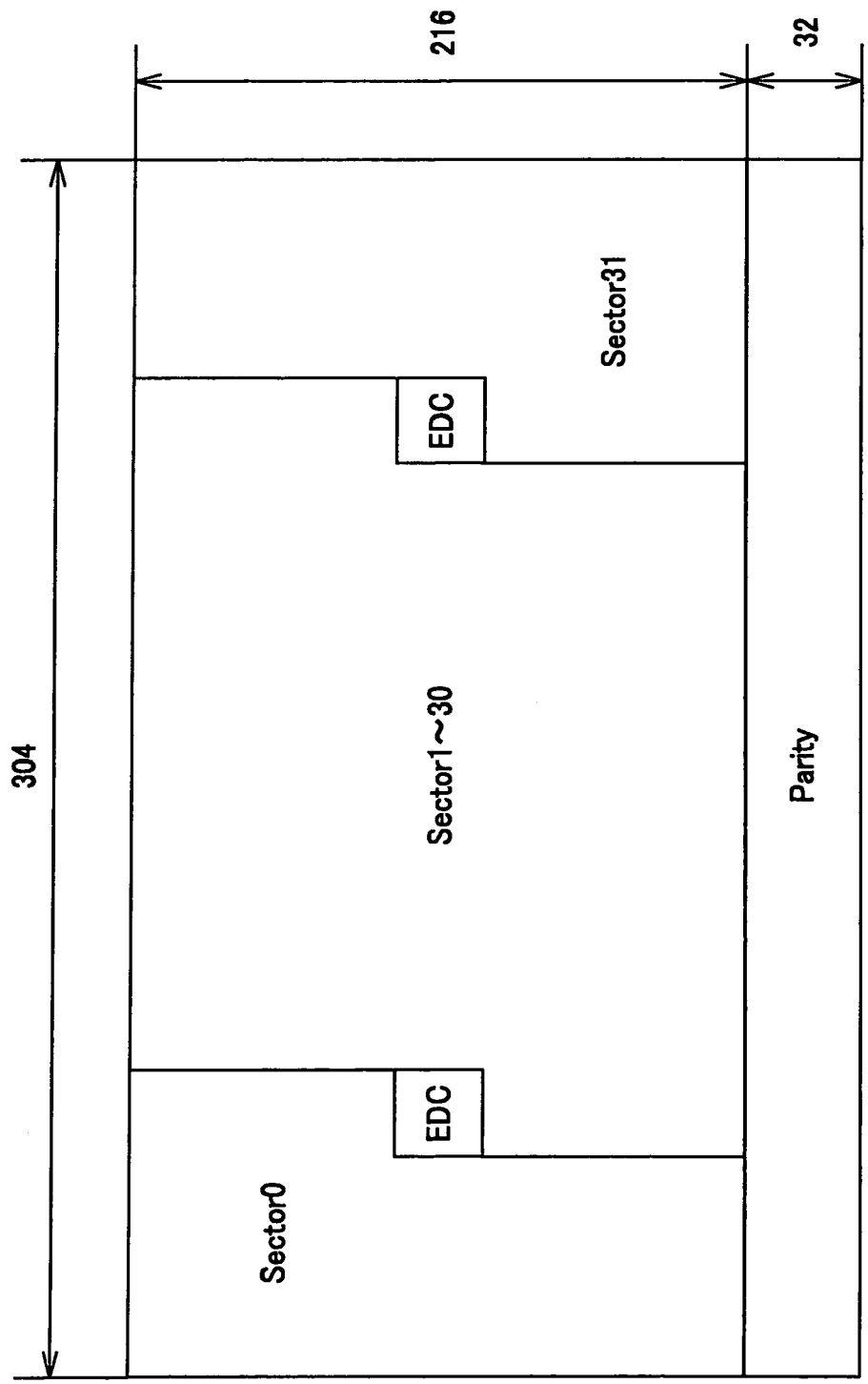
FIG. 2 is a view for explaining an RS-LDC block with BIS of an error correcting system in the next-generation MD1 and the next-generation MD2 described as specific examples of the present invention.

Specific embodiments of the present invention will now be described with reference to the drawings.

The present invention provides an address conversion method for performing conversion from one address to another address between a first address set for data and a second address set for a recording format on a recording medium. At least part of the second address is caused to correspond to a part of the first address. A part lower than least significant position of the part of the first address is generated in accordance with a predetermined rule, and a part higher than the most significant position of the part of the first address is extended by predetermined digit(s) so that the first address and the second address correspond to each other. In the case of recording data in plural recording formats to the recording medium, it is practically possible to handle a data volume with a higher density without causing any inconvenience while utilizing the existing recording format.

In this disc drive device, a signal format that is different from an ordinary recording format used as a recording/reproducing format for a disc-like recording medium employing a conventional magneto-optical recording system is applied to this disc-like recording medium, thus realizing increase in recording capacity of the conventional magneto-optical recording medium. Moreover, as a high-density recording technique and a new file system are used, a recording format is provided that enables significant increase in recording capacity while maintaining the compatibility of the appearance of casing and the recording/reproducing optical system with those of the conventional magneto-optical recording medium.

In this specific embodiment, as a disc-like magneto-optical recording medium, a recording medium of the mini disc (trademark registered) system is used. Particularly, a disc that has realized increase in recording capacity of the conventional magneto-optical recording medium by employing a format that is different from an ordinarily used recording format will be explained as "next-generation MD1", and a disc that has realized increase in recording capacity by applying a new recording format to a new recording medium capable of high-density recording will be explained as "next-generation MD2".

Hereinafter, exemplary specifications of the next-generation MD1 and the next-generation MD2 will be described, and processing to generate recording data for both discs using an address conversion method according to the present invention will also be described.

1. Disc Specifications and Area Structure

First, the specifications of the conventional mini disc, the next-generation MD1 and the next-generation MD2 will be described with reference to FIG. 1. The physical format of the mini disc (and MD-DATA) is defined as follows. The track pitch is 1.6 $\mu$m. The bit length is 0.59 $\mu$m/bit. The laser wavelength $\lambda$ is $\lambda$=780 nm. The numerical aperture of the optical head is NA=0.45. As its recording system, a groove recording system used for recording and reproduction based on grooves (on the disc surface) as tracks is employed. In an address system for this, a single-spiral groove is formed on the disc surface, a meandering wobble is formed on both sides of the groove at a predetermined frequency (22.05 kHz), and an absolute address is FM-modulated with reference to the above-mentioned frequency and recorded to the wobbled groove track. In this specification, the absolute address recorded as a wobble is also referred to as ADIP (address in pre-groove).

On the conventional MD, recording is performed using 32 sectors as a main data part and 4 sectors as link sectors, that is, a total of 36 sectors, as one cluster unit. The ADIP signal includes a cluster address and a sector address. The cluster address includes an 8-bit cluster H and an 8-bit cluster L. The sector address includes a 4-bit sector.

For the conventional mini disc, an EFM (8-14 modulation) modulation system is employed as a recording data modulation system. As its error correcting system, ACIRC (advanced cross interleave Reed-Solomon code) is used. For data interleave, convolution is employed. Therefore, the redundancy of data is 46.3%.

The data detecting system on the conventional mini disc is a bit-by-bit system. As its disc driving system, a CLV (constant linear velocity) system is used. The constant linear velocity is 1.2 m/s.

The standard data rate in recording and reproduction is 133 KB/s. The recording capacity is 164 MB (140 MB for MD-DATA). The minimum rewriting unit (unit cluster) of data includes 36 sectors, that is, 32 main sectors and 4 link sectors, as described above.

Next, the next-generation MD1 described as the specific embodiment will be described. The next-generation MD1 has the same physical specifications as the above-described conventional mini disc. Therefore, the track pitch is 1.6 $\mu$m. The laser wavelength $\lambda$ is $\lambda$=780 nm. The numerical aperture of the optical head is NA=0.45. As its recording system, the groove recording system is employed. As its address system, ADIP is used. Since the structure of the optical system in the disc drive device, the ADIP address reading system and the servo processing are the same as those for the conventional mini disc, compatibility with the conventional disc is achieved.

As the modulation system for recording data, the next-generation MD1 employs an RLL(1-7)PP modulation system (where RLL represents "run length limited" and PP represents "parity preserve/prohibit rmtr (repeated minimum transition runlength)"). As its error correcting system, an RS-LDC (Reed Solomon-long distance code) system with BIS (burst indicator subcode) having higher correction capability is used.

Figure 3:
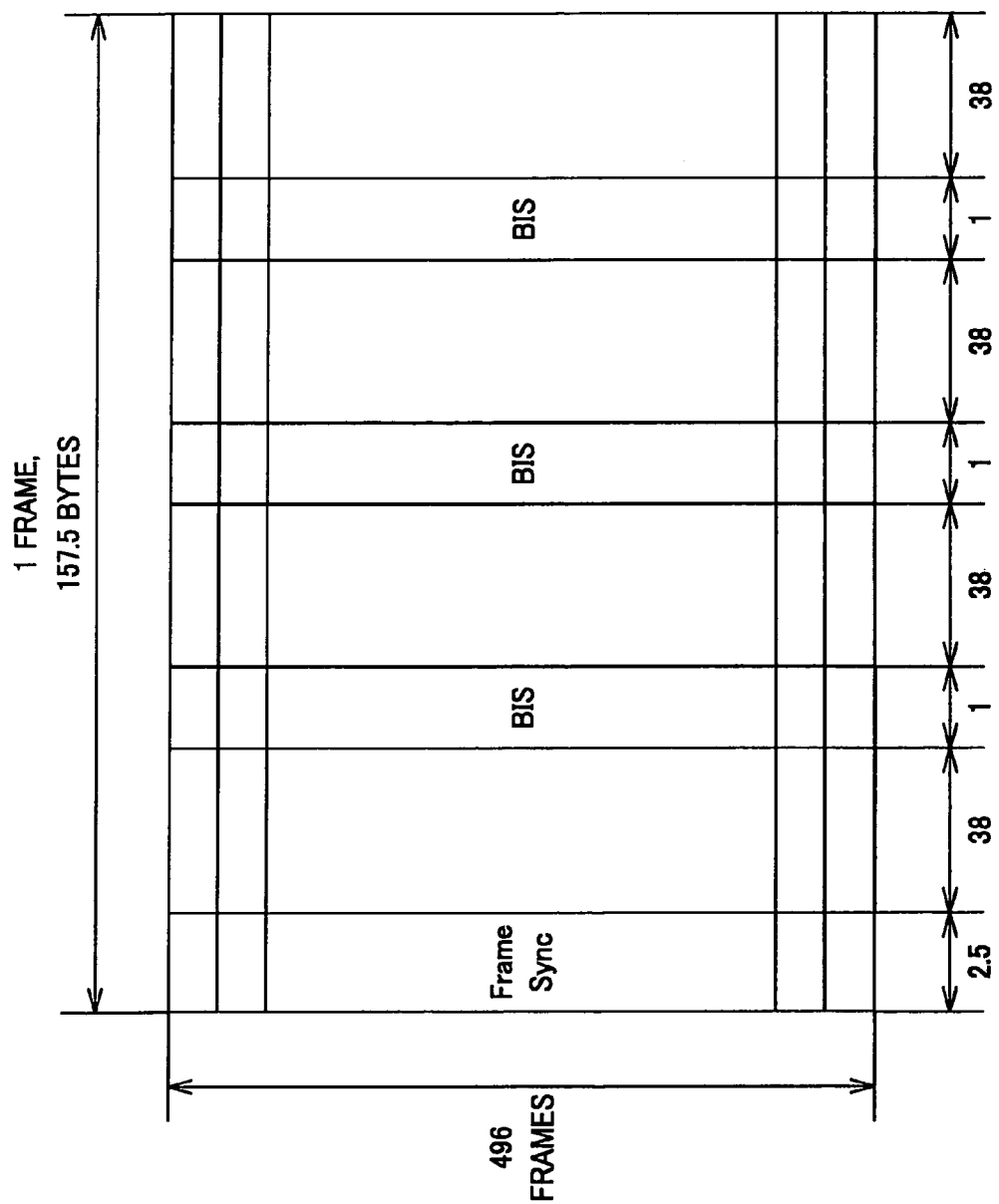
FIG. 3 is a view for explaining the BIS arrangement in one recording block of the next-generation MD1 and the next-generation MD2 described as specific examples of the present invention.

Specifically, 2052 bytes, including 2048 bytes of user data supplied from a host application or the like and an EDC (error detection code) of 4 bytes, are handled as 1 sector (that is, a data sector different from a physical sector on the disc, which will be described later), and 32 sectors of sector 0 to sector 31 are grouped into a block consisting of 304 columns×216 rows, as shown in FIG. 2. Scrambling processing to take exclusive OR (EX-OR) with a predetermined pseudo-random number is performed to 2052 bytes of each sector. To each column of the block to which scrambling processing has been thus performed, a 32-byte parity is added to constitute an LDC (long distance code) block of 304 columns×248 rows. Interleave processing is performed to this LDC block to form a block (interleaved LDC block) of 152 columns×496 rows, and one column of the above-described BIS is arranged every 38 columns, thus forming a structure consisting of 155 columns×496 rows, as shown in FIG. 3. Moreover, a frame synchronizing code (frame sync) of 2.5 bytes is added to the leading end position, and each row is caused to correspond to one frame, thus forming a structure consisting of 157.5 bytes×496 frames. The respective rows of FIG. 3 are equivalent to 496 frames of frame 10 to frame 505 of a data area in one recording block (cluster) shown in FIG. 9, which will be described later.

In the above-described data structure, data interleave is of block-completion type. This allows data redundancy of 20.50%. As the data detecting system, a Viterbi decoding system based on PR(1, 2, 1)ML is used.

For the disc driving system, the CLV system is used with a linear velocity is 2.4 m/s. The standard data rate in recording and reproduction is 4.4 MB/s. As this system is employed, a total recording capacity of 300 MB can be secured. Since the modulation system is changed from the EFM modulation system to the RLL(1-7)PP modulation system, the window margin is increased from 0.5 to 0.666 and therefore a higher density by 1.33 times can be realized. A cluster, which is the minimum data rewriting unit, includes 16 sectors, 64 KB. Since the recording modulation system is thus changed from the CIRC system to the RS-LDC system with BIS and the system using the difference in sector structure and Viterbi decoding, the data efficiency is improved from 53.7% to 79.5% and therefore a higher density by 1.48 times can be realized.

By combining these, the next-generation MD1 can realize a recording capacity of 300 MB, which is approximately twice the recording capacity of the conventional mini disc.

On the other hand, the next-generation MD2 is a recording medium to which a higher-density recording technique such as a domain wall displacement detection system (DWDD) is applied. The next-generation MD2 has a physical format that is different from those of the above-described conventional mini disc and next-generation MD1. The next-generation MD2 has a track pitch of 1.25 μm and a bit length of 0.16 μm/bit, and has a higher density in a linear direction.

To achieve compatibility with the conventional mini disc and the next-generation MD1, the optical system, the reading system, the servo processing and the like are made conformable to the conventional standards, that is, laser wavelength λ=780 nm and numerical aperture of the optical head NA=0.45. The recording system is the groove recording system. The address system is the system using ADIP. The casing appearance is also made conformable to the standards of the conventional mini disc and the next-generation MD1.

However, when reading a narrow track pitch and linear density (bit length) than in the conventional technique as described above using an optical system equivalent to that of the conventional mini disc or the next-generation MD1, it is necessary to solve restraining conditions in de-tracking margin, cross talk from lands and grooves, cross talk of wobbles, focusing leakage, and CT signal. Therefore, the next-generation MD2 is characterized in that the depth, gradient, width and the like of the groove are changed. Specifically, the depth of the groove is defined within a range of 160 to 180 nm. The gradient is defined within a range of 60 to 70°. The width is defined within a range of 600 to 800 nm.

The next-generation MD2 employs the RLL(1-7)PP modulation system (where RLL represents "run length limited" and PP represents "parity preserve/prohibit rmtr (repeated minimum transition runlength)") adapted for high-density recording, as the modulation system for recording data. As the error correcting system, the RS-LDC (Reed Solomon-long distance code) system with BIS having higher correction capability is used.

Data interleave is of block-completion type. This allows data redundancy of 20.50%. The data detecting system is the Viterbi decoding system based on PR(1, -1)ML. A cluster, which is the minimum data rewriting unit, includes 16 sectors, 64 KB.

As the disc driving system, a ZCAV (zone constant angular velocity) system is used with a linear velocity of 2.0 m/s. The standard data rate in recording and reproduction is 9.8 MB/s. Therefore, the next-generation MD2 can achieve a total recording capacity of 1 GB by employing the DWDD system and this driving system.

Figure 4:
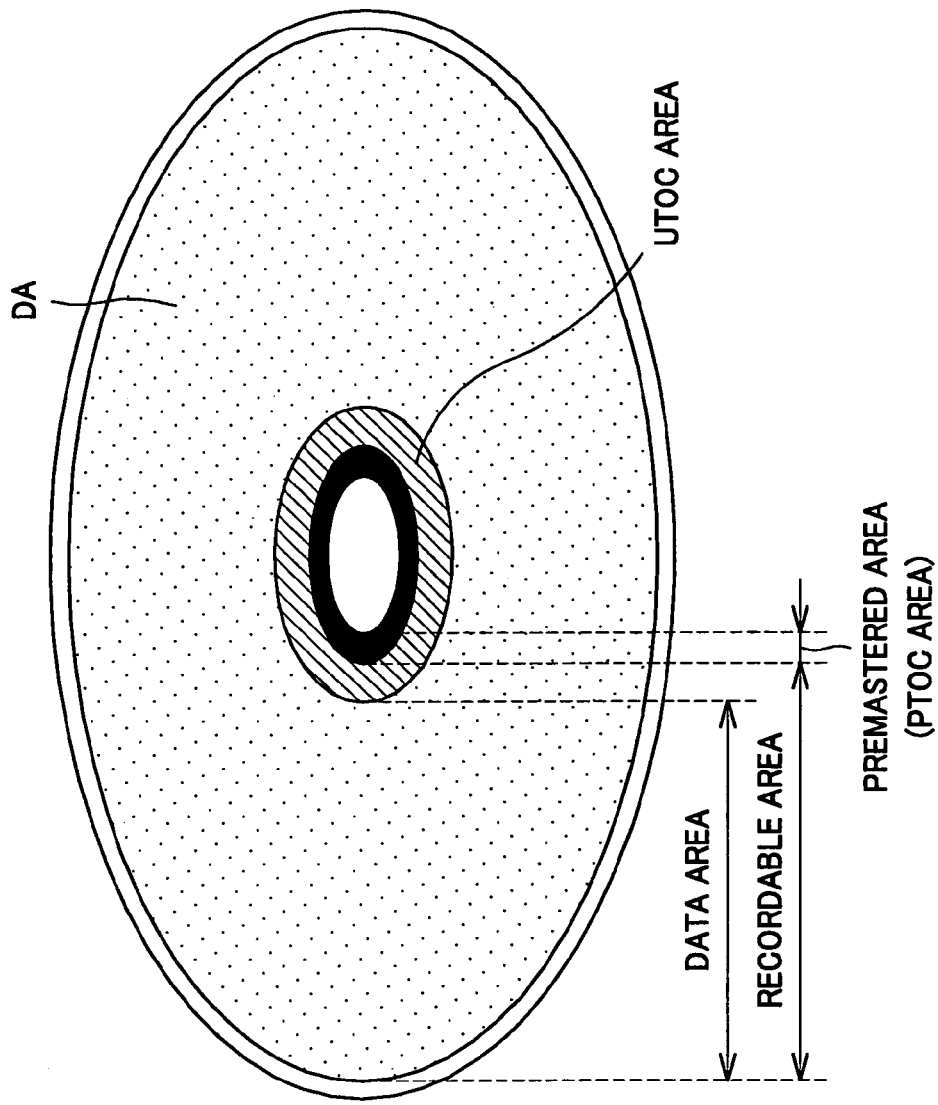
FIG. 4 is a schematic view for explaining the area structure on the disc surface of the next-generation MD1 described as a specific example of the present invention.
Figure 5:
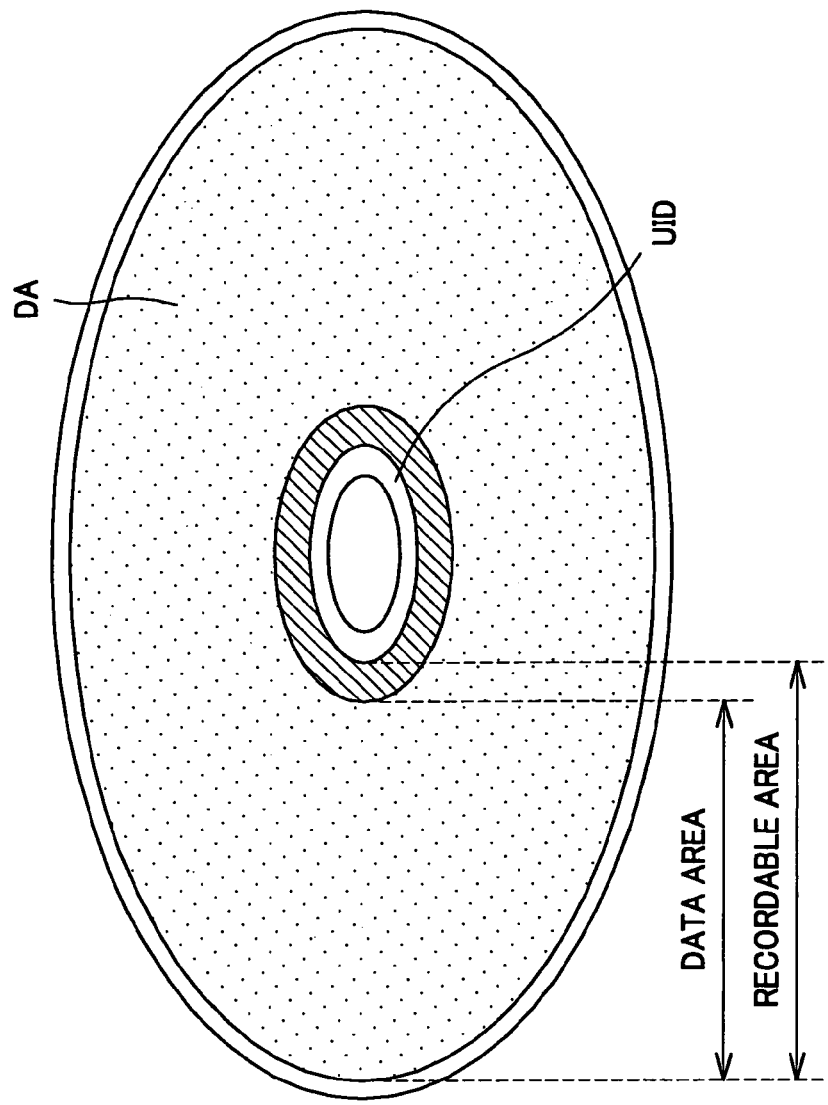
FIG. 5 is a schematic view for explaining the area structure on the disc surface of the next-generation MD2 described as a specific example of the present invention.

FIGS. 4 and 5 show an exemplary area structure on the disc surface of the next-generation MD1 of this specific embodiment. The next-generation MD1 is the same medium as the conventional mini disc. On the innermost circular side of the disc, PTOC (premastered table of contents) is provided as a premastered area. In this area, disc management information is recorded as embossed pits based on physical structural deformation.

On the circular side outer than the premastered area, a recordable area is provided in which magneto-optical recording can be made. This is a recordable/reproducible area in which a groove as a guide groove to a recording track is formed. On the innermost circular side of this recordable area, a UTOC (user table of contents) area is provided. In this UTOC area, UTOC information is described, and a buffer area with respect to the premastered area and a power calibration area used for output power adjustment of a laser beam or the like are provided.

The next-generation MD2 uses no pre-pits to realize a higher density, as shown in FIG. 5. Therefore, the next-generation MD2 has no PTOC area. On the next-generation MD2, a unique ID (UID) area to record information for copyright protection, information for checking data falsification, other non-public information and the like is provided in an area inner than the recordable area. In this UID area, information is recorded in a recording format that is different from the DWDD system applied to the next-generation MD2.

On the next-generation MD1 and the next-generation MD2, audio tracks for music data and data tracks can be recorded in a mixed manner. In this case, an audio recording area AA in which at least one audio track is recorded and a PC data recording area DA in which at least one data track is recorded are formed at arbitrary positions in the data area, for example, as shown in FIG. 6.

Figure 6:
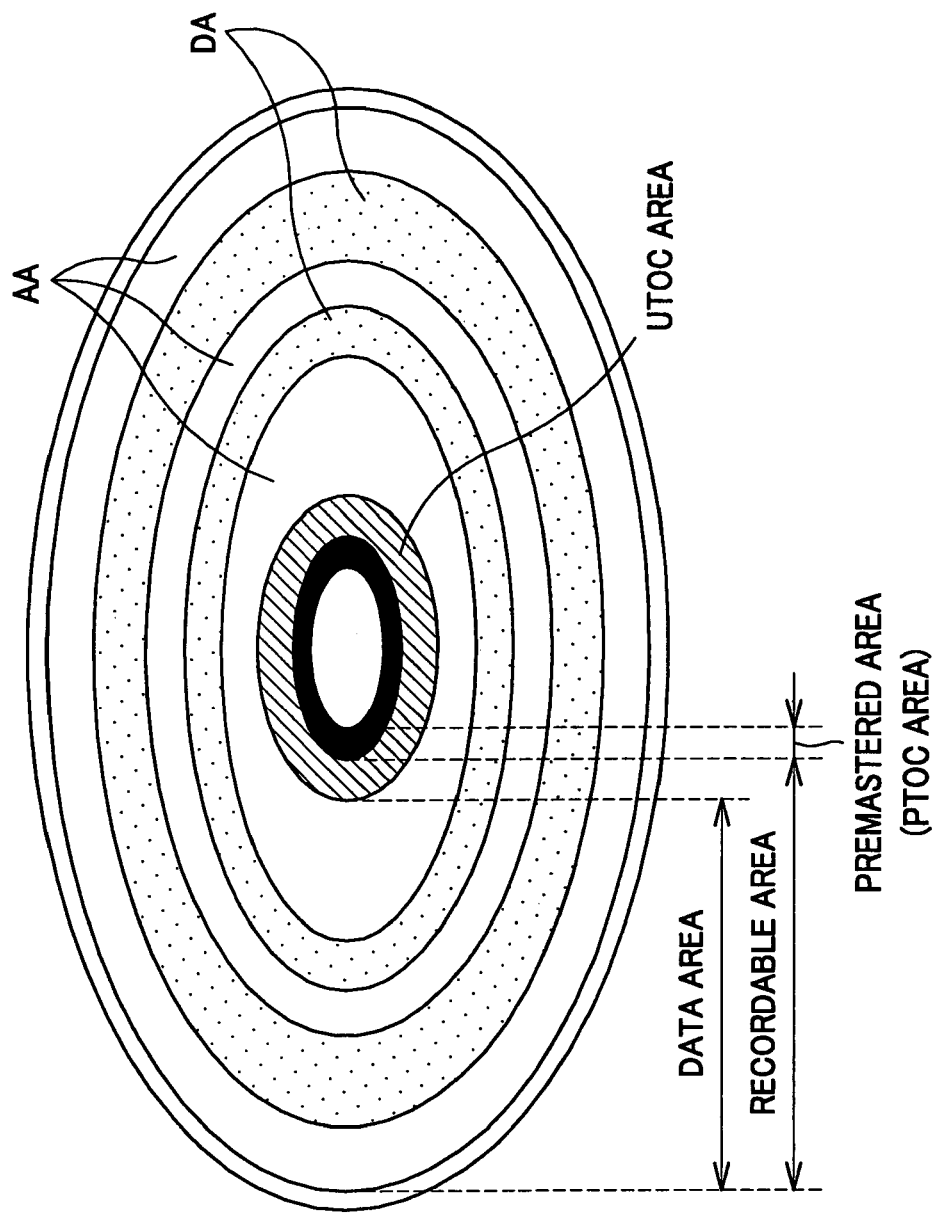
FIG. 6 is a schematic view for explaining the area structure on the disc surface in the case where audio data and PC data are recorded in a mixed manner on the next-generation MD1 described as a specific example of the present invention.

A series of audio track and data track need not necessarily recorded in a physically continuous manner on the disc but may be dividedly recorded as plural parts as shown in FIG. 6. Parts means sections that are recorded in a physically continuous manner. Specifically, even when there are two PC data recording areas that are physically separate as shown in FIG. 6, the number of data tracks may be one or plural. While FIG. 6 shows the physical specifications of the next-generation MD1, the audio recording area AA and the PC data recording area DA can be similarly recorded on the next-generation MD2 in a mixed manner.

A specific example of a recording/reproducing device compatible with the next-generation MD1 and the next-generation MD2 having the above-described physical specifications will be later described in detail.

2. Management Structure of Disc

Figure 7:
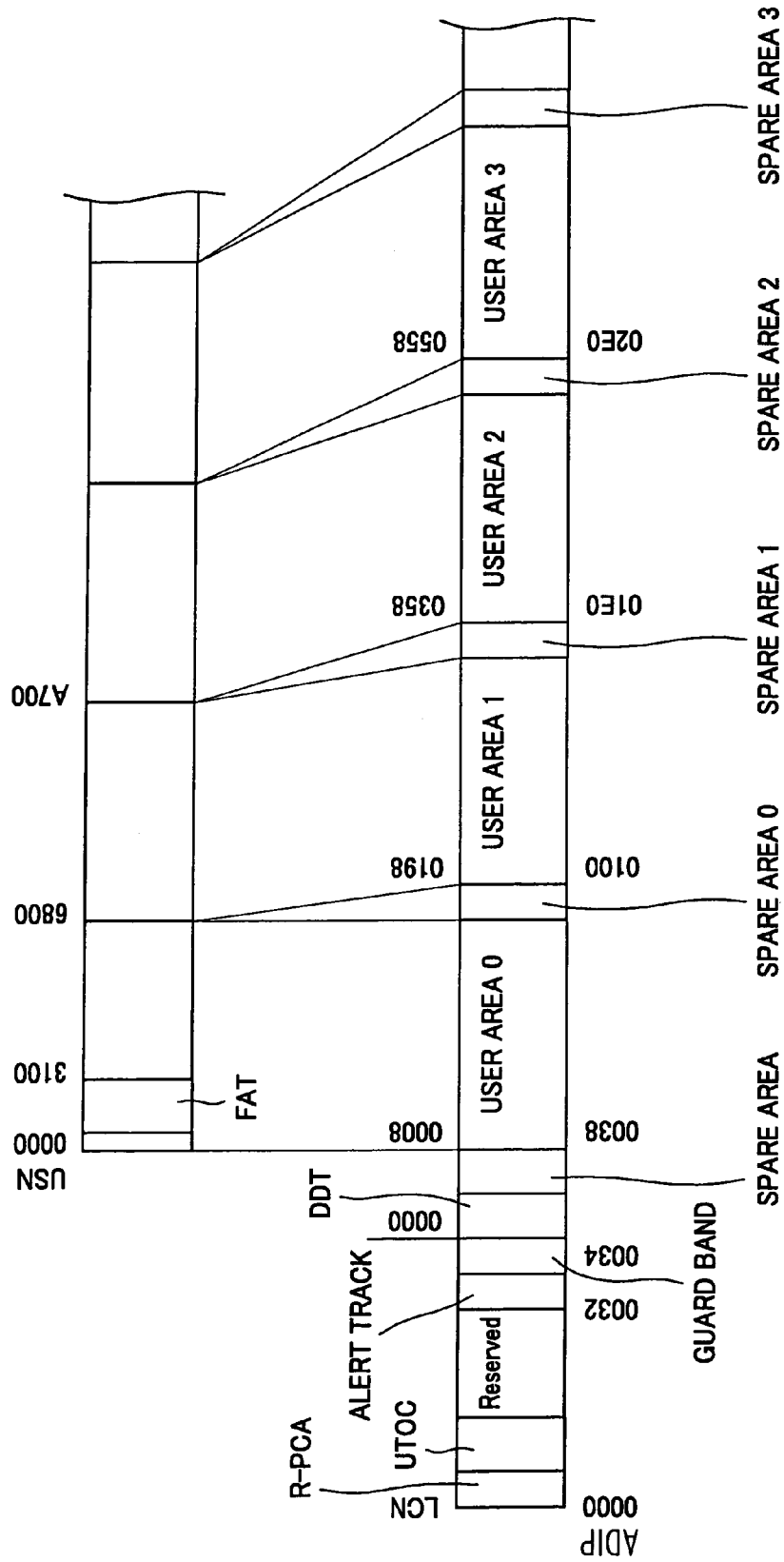
FIG. 7 is a schematic view for explaining the data management structure of the next-generation MD1 described as a specific example of the present invention.
Figure 8:
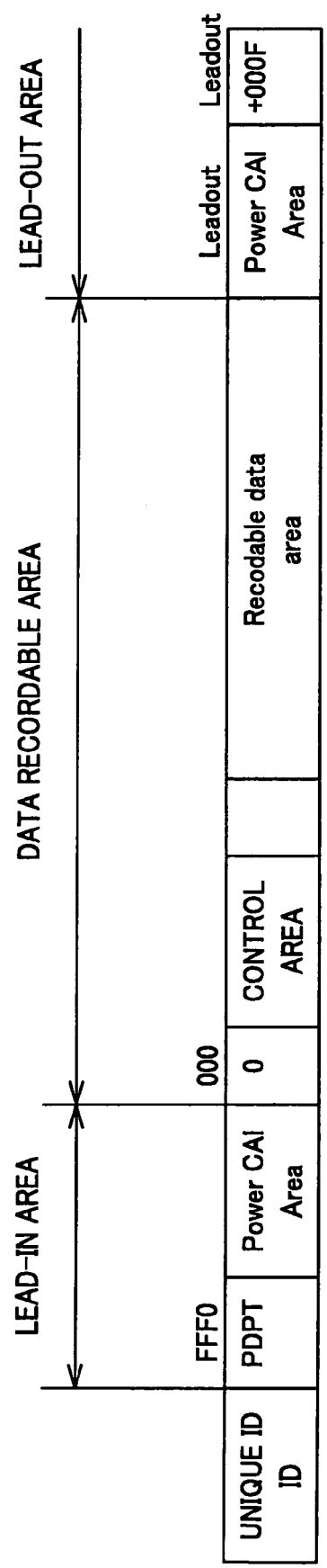
FIG. 8 is a schematic view for explaining the data management structure of the next-generation MD2 described as a specific example of the present invention.

The management structure of the disc of this specific embodiment will be described with reference to FIGS. 7 and 8. FIG. 7 shows the data management structure of the next-generation MD1. FIG. 8 shows the data management structure of the next-generation MD2.

Since the next-generation MD1 is the same medium as the conventional mini disc as described above, PTOC is recorded on the next-generation MD1 in the form of embossed pits that cannot be rewritten, as employed in the conventional mini disc. In this PTOC, the total capacity of the disc, the UTOC position in the UTOC area, the position of the power calibration area, the start position of the data area, the end position of the data area (lead-out position) and the like are recorded as management information.

On the next-generation MD1, the power calibration area (rec power calibration area) for adjusting the writing output of a laser is provided at ADIP addresses 0000 to 0002. At the subsequent addresses 0003 to 0005, UTOC is recorded. UTOC includes management information that is rewritten in accordance with recording, erasure and the like of tracks (audio track/data track) and manages the start position, the end position and the like of the respective tracks and parts constituting the tracks. UTOC also manages parts in a free area in which no track has been recorded yet, that is, a writable area. In UTOC, the whole PC data is managed as one track independent of MD audio data. Therefore, even if an audio track and a data track are recorded in a mixed manner, the recording positions of PC data divided into plural parts can be managed.

UTOC data is recorded in a specified ADIP cluster in this UTOC area. The content of the UTOC data is defined by each sector in this ADIP cluster. Specifically, UTOC sector 0 (the leading ADIP sector in this ADIP cluster) manages parts corresponding to the tracks and free area. UTOC sector 1 and UTOC sector 4 manages character information corresponding to the tracks. In UTOC sector 2, information for managing the recording date and time corresponding to the tracks is written.

UTOC sector 0 is a data area in which recorded data, recordable non-recorded area, data management information and the like are recorded. For example, when recording data to the disc, the disc drive device finds out a non-recorded area on the disc from the UTOC sector 0 and records data into this area. In reproduction, the disc drive device judges, from UTOC sector 0, the area where a data track to be reproduced is recorded, and accesses that area to perform reproduction.

On the next-generation MD1, PTOC and UTOC are recorded as data modulated in accordance with a system conformable to the conventional mini disc system, that is, in this case, the EFM modulation system. Therefore, the next-generation MD1 has an area where data modulated in accordance with the EFM modulation system is recorded, and an area where high-density data modulated in accordance with the RS-LDC and RLL(1-7)PP modulation systems is recorded.

An alert track described at ADIP address 0032 stores information for notification to the effect that the next-generation MD1 is not supported by a disc driver device for the conventional mini disc even when the next-generation MD1 is inserted into the disc driver device for the conventional mini disc. This information may be audio data that says "The format of this disc is not supported by this reproducing device," or warning sound data. In the case of a disc driver device having a display unit, this information may be data for displaying the notification. This alert track is recorded in accordance with the EFM modulation system so that it can be read by the disc driver device corresponding to the conventional mini disc.

At ADIP address 0034, a disc description table (DDT) describing disc information of the next-generation MD1 is recorded. In DDT, the format, the total number of logical clusters on the disc, proper ID of the medium, update information of this DDT, defective cluster information and the like are described.

In the DDT area and subsequent areas, data is recorded as high-density data modulated in accordance with the RS-LDC and RLL(1-7)PP modulation systems. Therefore, a guard band area is provided between the alert track and DDT.

At the earliest ADIP address where high-density data modulated by the RLL(1-7)PP modulation system is recorded, that is, at the leading address of DDT, a logical cluster number (LCN) is appended, which defines this address as 0000. One logical cluster includes 65,536 bytes. This logical cluster is a minimum unit for reading/writing. ADIP addresses 0006 to 0031 are reserved.

At the subsequent ADIP addresses 0036 to 0038, a secure area is provided, which can be made public by authentication. This secure area manages attributes representing whether the respective clusters constituting data can be made public or not. Particularly, information for copyright protection, information for checking data falsification and the like are recorded in this secure area. Various other non-public information can be recorded, too. This non-public area allows limited access by a specially permitted specific external device, and also includes information for authenticating this external device that is allowed to access this area.

At ADIP address 0038 and the subsequent ADIP addresses, a user area (with an arbitrary data length) where writing and reading can be freely carried out, and a spare area (with a data length 8) are described. Data recorded in the user area, when arrayed in LCN ascending order, is sectioned into user sectors in which 2,048 bytes from the leading end form one unit. An external device such as PC manages this data by appending a user sector number (USN) of 0000 for the leading user sector and using an FAT file system.

The data management structure of the next-generation MD2 will now be described with reference to FIG. 8. The next-generation MD2 has no PTOC. Therefore, all the disc management information such as the total capacity of the disc, the position of the power calibration area, the start position of the data area and the end position of the data area (lead-out position) is included as PDPT (preformat disc parameter table) in ADIP information and thus recorded. Data is modulated in accordance with the RS-LDC modulation system with BIS and the RLL(1-7)PP modulation system and recorded in the DWDD format.

In a lead-in area and a lead-out area, the laser power calibration area (PCA) is provided. On the next-generation MD2, LCN 0000 is appended to an ADIP address following PCA.

On the next-generation MD2, a control area equivalent to the UTOC area of the next-generation MD1 is prepared. FIG. 8 shows a unique ID (UID) area where information for copyright protection, information for checking data falsification and other non-public information are recorded. Actually, this UID area is provided at a position inner than the lead-in area, and data is recorded therein in a recording format that is different from the ordinary DWDD format.

Files of the next-generation MD1 and the next-generation MD2 are managed on the basis of FAT file systems. For example, the respective data tracks have individual FAT file systems. Alternatively, one FAT file system may be recorded to cover plural data tracks.

3. ADIP Sector/Cluster Structure and Data Block

The relation between the ADIP sector structures and data blocks of the next-generation MD1 and the next-generation MD2 described in the specific embodiment of the present invention will now be described with reference to FIG. 9. The conventional mini disc (MD) system employs a cluster/ sector structure corresponding to the physical address recorded as ADIP. In this embodiment, a cluster based on the ADIP address is referred to as "ADIP cluster", as a matter of convenience. A cluster based on the address on the next-generation MD1 and the next-generation MD2 is referred to as "recording block" or "next-generation MD cluster".

Figure 9:
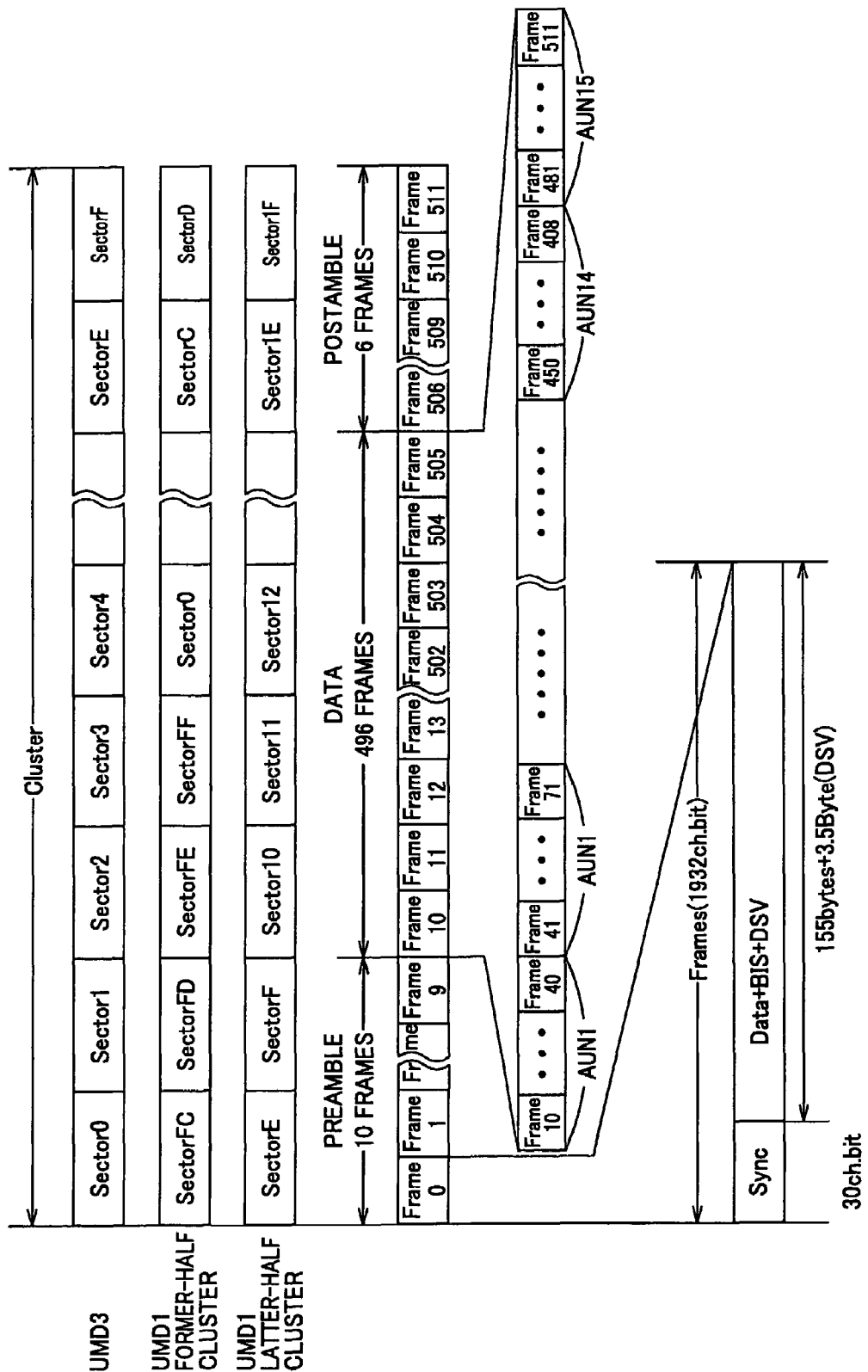
FIG. 9 is a schematic view for explaining the relation between an ADIP sector structure and a data block of the next-generation MD1 and the next-generation MD2 described as specific example of the present invention.

On the next-generation MD1 and the next-generation MD2, a data track is handled as a data stream recorded in the form of continuous clusters, which are minimum units of address, as shown in FIG. 9.

As shown in FIG. 9, in the case of the next-generation MD1, one conventional cluster (36 sectors) is bisected so that one recording block consists of 18 sectors. In the case of the next-generation MD2, one recording block consists of 16 sectors.

The data structure of one recording block (one next-generation MD cluster) shown in FIG. 9 includes 512 frames, that is, a preamble made up of 10 frames, a post-amble made up of 6 frames, and a data part made up of 496 frames. One frame in this recording block includes a synchronizing signal area, data, BIS and DSV.

Of the 512 frames of one recording block, each of groups of frames obtained by equally dividing 496 frames where main data is recorded into 16 is referred to as address unit. Each address unit includes 31 frames. The number of this address unit is referred to as address unit number (AUN). This AUN is a number appended to all address units and is used for address management of recording signals.

In the case of recording high-density data modulated in accordance with the 1-7PP modulation system to the conventional mini disc having the physical cluster/sector structure described in ADIP as in the next-generation MD1, a problem arises that the ADIP address originally recorded on the disc and the address of the actually recorded data block do not coincide with each other. In random access, which is carried out with reference to the ADIP address, even if a position near the position where desired data is recorded is accessed when reading out data, the recorded data can be read out. However, when writing data, it is necessary to access an accurate position so as not to overwrite and erase already recorded data. Therefore, it is important to accurately grasp the access position from the next-generation MD cluster/next-generation MD sector corresponding to the ADIP address.

Thus, in the case of the next-generation MD1, the high-density data cluster is grasped, using a data unit obtained by converting the ADIP address recorded as a wobble on the medium surface in accordance with a predetermined rule. In this case, an integral multiple of the ADIP sector is caused to be the high-density data cluster. On the basis of this idea, when describing the next-generation MD cluster with respect to one ADIP cluster recorded on the conventional mini disc, each next-generation MD cluster is caused to correspond to a ½-ADIP cluster (18 sectors).

Therefore, in the case of the next-generation MD1, a ½-cluster of the conventional MD cluster is handled as a minimum recording unit (recording block).

On the other hand, in the case of the next-generation MD2, one cluster is handled as one recording block.

In this specific embodiment, a data block made up of 2048 bytes as a unit supplied from the host application is handled as one logical data sector (LDS), and a set of 32 logical data sectors recorded in the same recording block is handled as a logical data cluster (LDC), as described above.

With the data structure as described above, when recording next-generation MD data to an arbitrary position, recording to the medium at good timing can be realized. Moreover, as an integral number of next-generation MD clusters are included in an ADIP cluster, which is an ADIP address unit, the address conversion rule for converting the ADIP cluster address to the next-generation MD data cluster address is simplified and the circuit or software structure for the conversion can be simplified.

While two next-generation MD clusters are caused to correspond to one ADIP cluster in the example shown in FIG. 9, three or more next-generation MD clusters can be arranged with respect to one ADIP cluster. In this case, one next-generation MD cluster is not limited to the construction made up of 16 ADIP sectors. The next-generation MD cluster can be set in accordance with the difference in data recording density between the EFM modulation system and the RLL(1-7)PP modulation system, the number of sectors constituting a next-generation cluster, the size of one sector and the like.

Figure 13:
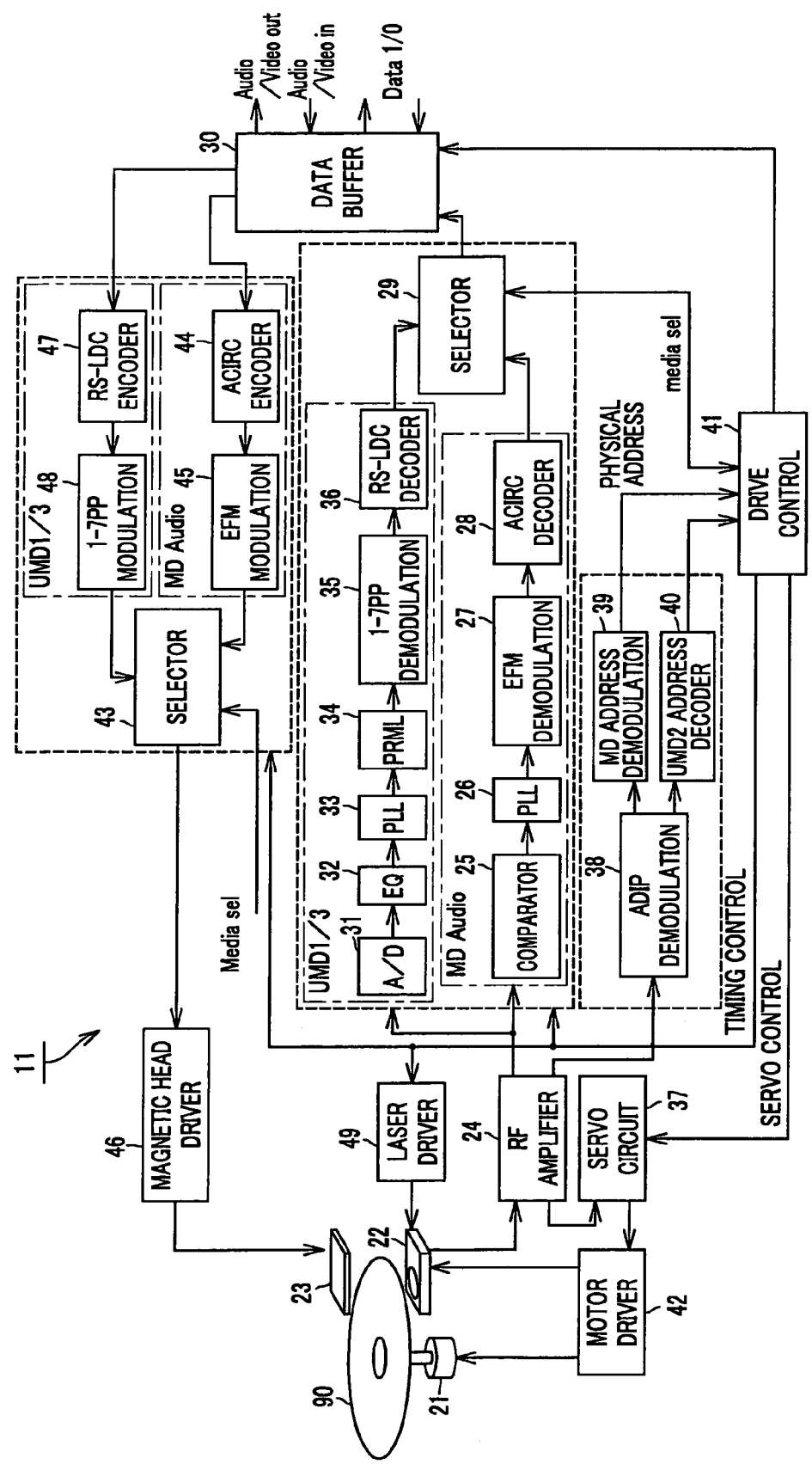
FIG. 13 is a block diagram for explaining a medium drive unit of the disc drive device.

While FIG. 9 shows the data structure on the recording medium, a data structure in the case where an ADIP signal recorded on a groove wobble track on the recording medium is demodulated by an ADIP demodulator 38 of FIG. 13, which will be described later, will now be explained.

FIG. 10A shows the data structure of ADIP of the next-generation MD2. FIG. 10B shows the data structure of ADIP of the next-generation MD1.

In the case of the next-generation MD1, a synchronizing signal, cluster H information and cluster L information representing cluster numbers on the disc, sector information including sector numbers in the cluster are described. The synchronizing signal is described by 4 bits. The cluster H is described by upper 8 bits of address information. The cluster L is described by lower 8 bits of the address information. The sector information is described by 8 bits. CRC is added to the latter 14 bits. In this manner, an ADIP signal of 42 bits is recorded in each ADIP sector.

In the case of the next-generation MD2, synchronizing signal data of 4 bits, cluster H information of 4 bits, cluster M information of 8 bits, cluster L information of 4 bits, and sector information of 4 bits are described. A BCH parity is added to the latter 18 bits. Also in the case of the next-generation MD2, an ADIP signal of 42 bits is similarly recorded in each ADIP sector.

In the data structure of ADIP, the construction of the above-described cluster H information, cluster M information and cluster L information can be arbitrarily decided. Alternatively, other additional information can be described in this part. For example, in an ADIP signal on the next-generation MD2, cluster information is represented by a cluster H of upper 8 bits and a cluster L of lower 8 bits, as shown in FIG. 11, and disc control information can be described instead of the cluster L of lower 8 bits. The disc control information may be a servo signal correction value, upper limit value of reproducing laser power, linear velocity correction coefficient for reproducing laser power, upper limit value of recording laser power, linear velocity correction coefficient for recording laser power, recording magnetic sensitivity, magnetism-laser pulse phase difference, parity and the like.

4. Disc Drive Device

A specific example of a disc drive device 10 capable of performing recording and reproduction of the next-generation MD1 .and the next-generation MD2 will be described with reference to FIGS. 12 and 13. The disc drive device 10 can be connected to a personal computer (hereinafter referred to as PC) 100 and can use the next-generation MD1 and the next-generation MD2 as external storage for audio data and for PC and the like.

The disc drive device 10 has a medium drive unit 11, a memory transfer controller 12, a cluster buffer memory 13, an auxiliary memory 14, USB interfaces 15, 16, a USB hub 17, a system controller 18, and an audio processing unit 19.

The medium drive unit 11 performs recording to/reproduction from an individual disc 90 loaded thereon such as the conventional mini disc, the next-generation MD1 or the next-generation MD2. The internal structure of the medium drive unit 11 will be described later with reference to FIG. 13.

The memory transfer controller 12 controls transmission/reception of reproduction data from the medium drive unit 11 and recording data to be supplied to the medium drive unit 11. The cluster buffer memory 13 buffers data read out by each high-density data cluster from a data track of the disc 90 by the medium drive unit 11, under the control of the memory transfer controller 12. The auxiliary memory 14 stores various management information and special information such as UTOC data, CAT data, unique ID and hash value read out from the disc by the medium drive unit 11, under the control of the memory transfer controller 12.

The system controller 18 can communicate with the PC 100 connected via the USB interface 16 and the USB hub 17. The system controller 18 controls communication with the PC 100, performs reception of commands such as a writing request and a reading request and transmission of status information and other necessary information, and integrally controls the whole disc drive device 10.

For example, when the disc 90 is loaded on the medium drive unit 11, the system controller 18 instructs the medium drive unit 11 to read out management information and the like from the disc 90 and causes the memory transfer controller 12 to control the auxiliary memory 14 to store the read-out management information and the like such as PTOC and UTOC.

By reading the management information, the system controller 18 can grasp the track recording state of the disc 90. Moreover, by reading CAT, the system controller 18 can grasp the high-density data cluster structure within the data track and can be ready to respond to an access request for the data track from the PC 100.

With the unique ID and the hash value, the system controller 18 executes disc authentication processing and other processing, transmits these values to the PC 100, and causes the disc authentication processing and other processing to be executed on the PC 100.

When a reading request for a certain FAT sector is sent from the PC 100, the system controller 18 gives the medium drive unit 11 a signal for reading out a high-density data cluster containing this FAT sector. The read-out high-density data cluster is written to the cluster buffer memory 13 by the memory transfer controller 12. However, if the data of the FAT sector has already been stored in the cluster buffer memory 13, the medium drive unit 11 need not read out the data.

In this case, the system controller 18 performs control to give a signal for reading out the data of the requested FAT sector from the data of the high-density data cluster that is being written to the cluster buffer memory 13, and to send the signal to the PC 100 via the USB interface 15 and the USB hub 17.

When a writing request for a certain FAT sector is sent from the PC 100, the system controller 18 causes the medium drive unit 11 to read out a high-density data cluster containing this FAT sector. The read-out high-density data cluster is written to the cluster buffer memory 13 by the memory transfer controller 12. However, if the data of the FAT sector has already been stored in the cluster buffer memory 13, the medium drive unit 11 need not read out the data.

The system controller 18 also supplies data of a FAT sector (recording data) sent from the PC 100, to the memory transfer controller 12 via the USB interface 15, and causes the memory transfer controller 12 to rewrite the data of the corresponding FAT sector on the cluster buffer memory 13.

The system controller 18 also instructs the memory transfer controller 12 to transfer to the medium drive unit 11 the data of the high-density data cluster stored in the cluster buffer memory 13 in which the requested FAT sector has been rewritten, as recording data. In this case, the medium drive unit 11 modulates and writes the recording data of the high-density data cluster, in accordance with the EFM modulation system if the loaded medium is the conventional mini disc, or in accordance with the RLL(1-7)PP modulation system if the loaded medium is the next-generation MD1 or the next-generation MD2.

In the disc drive device 10 described in this embodiment, the above-described recording/reproduction control is the control in the case of recording/reproducing a data track. Data transfer in recording/reproducing an MD audio data (audio track) is performed via the audio processing unit 19.

The audio processing unit 19 has, for example, an analog audio signal input part such as a line input circuit/microphone input circuit, an A/D converter, and a digital audio data input part, as an input system. The audio processing unit 19 also has an ATRAC compression encoder/decoder and a buffer memory for compressed data. The audio processing unit 19 also has a digital audio data output part, a D/A converter, and an analog audio signal output part such as a line output circuit/headphone output circuit, as an output system.

An audio track is recorded onto the disc 90 when digital audio data (or analog audio signal) is inputted to the audio processing unit 19. The inputted linear PCM digital audio data, or linear PCM audio data obtained by converting the inputted analog audio signal at the A/D converter, is ATRAC compression-encoded and stored into the buffer memory. After that, the audio data is read out from the buffer memory at predetermined timing and transferred to the medium drive unit 11.

The medium drive unit 11 modulates the transferred compressed data in accordance with the EFM modulation system or the RLL(1-7)PP modulation system and writes the modulated data to the disc 90 as an audio track.

When reproducing an audio track from the disc 90, the medium drive unit 11 demodulates reproduced data to ATRAC compressed data and transfers the demodulated data to the audio processing unit 19. The audio processing unit 19 performs ATRAC compression decoding to obtain linear PCM audio data and outputs the linear PCM audio data from the digital audio data output part.

Figure 12:
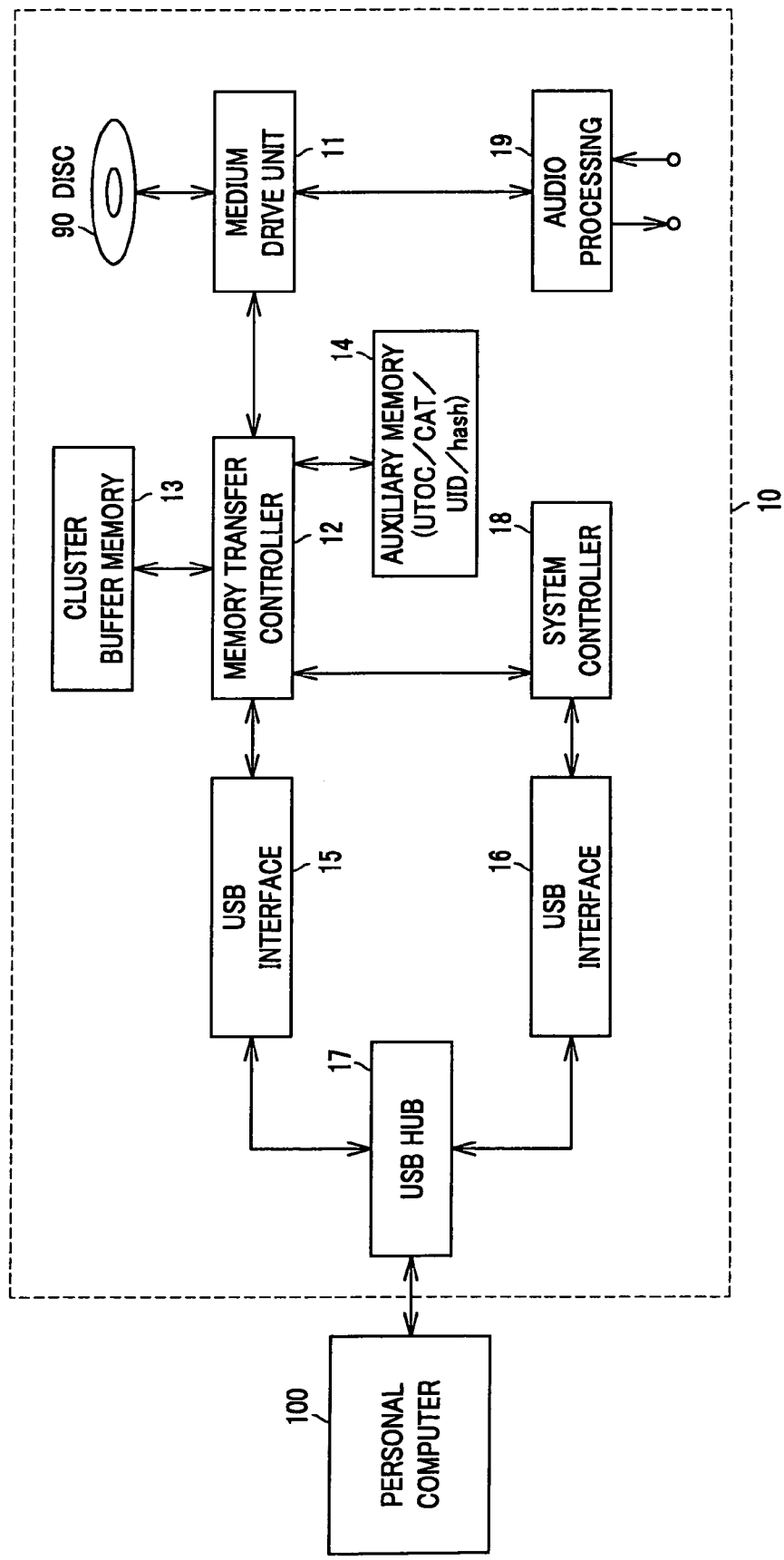
FIG. 12 is a block diagram for explaining a disc drive device for performing recording and reproduction compatible with the next-generation MD1 and the next-generation MD2 described as specific example of the present invention.

This structure shown in FIG. 12 is simply an example. The audio processing unit 19 is not necessary, for example, when the disc drive device 10 is connected with the PC 100 and is used as an external storage device for recording and reproducing only a data track. On the other hand, when the main purpose is to record and reproduce audio signals, it is preferred that the audio processing unit 19 is provided and that an operating unit and a display unit as user interfaces are provided. For the connection with the PC 100, not only USB but also a so-called IEEE1394 interface conformable to the standards prescribed by IEEE (Institute of Electrical and Electronics Engineers) and general-purpose connection interfaces can be applied.

Next, the structure of the medium drive unit 11 for recording and reproduction of the conventional mini disc, the next-generation MD1 and the next-generation MD2 will be described further in detail with reference to FIG. 13.

The medium drive unit 11 is characterized in that in order to record data to and reproduce data from the conventional mini disc, the next-generation MD1 and the next-generation MD2, it has a structure for executing EFM modulation and ACIRC encoding for recording on the conventional mini disc and a structure for executing RLL(1-7)PP modulation and RS-LDC encoding for recording on the next-generation MD1 and the next-generation MD2, particularly as a recording processing system. The medium drive unit 11 is also characterized in that it has a structure for executing EFM demodulation and ACIRC decoding for reproduction from the conventional mini disc and a structure for executing RLL(1-7) demodulation based on data detection using PR(1, 2, 1)ML and Viterbi decoding, and RS-LDC decoding for reproduction from the next-generation MD1 and the next-generation MD2, as a reproduction processing system.

The medium drive unit 11 rotationally drives the loaded disc 90 in the CLV system or the ZCAV system, using a spindle motor 21. In recording and reproduction, a laser beam is cast on the disc 90 from an optical head 22.

In recording, the optical head 22 outputs a laser beam of a high level for heating the recording track to the Curie temperature. In reproduction, the optical head 22 outputs a laser beam of a relatively low level for detecting data from reflected light by a magnetic Kerr effect. Therefore, the optical head 22 is equipped with an optical system including a laser diode as a laser output unit, a polarizing beam splitter, an objective lens and like, and a detector for detecting reflected light. The objective lens provided in the optical head 22 is held in such a manner that it can be displaced in a disc radial direction and a direction toward/away from the disc, for example, by a biaxial mechanism.

In this specific embodiment, in order to realize a maximum reproducing characteristic for the conventional mini disc, the next-generation MD1 and the next-generation MD2, which differ in physical specifications of medium surface, a phase compensating plate that can optimize the bit error rate at the time of data reading for all the discs is provided in the optical path of reading light of the optical head 22.

A magnetic head 23 is arranged at a position opposite to the optical head 22 with respect to the disc 90. The magnetic head 23 applies a magnetic field modulated by recording data, to the disc 90. Although not shown, a thread motor and a thread mechanism for moving the whole optical head 22 and the magnetic head 23 in the disc radial direction are provided.

In this medium drive unit 11, a recording processing system, a reproduction processing system, a servo system and the like are provided, in addition to a recording/reproducing head system including the optical head 22 and the magnetic head 23, and a disc rotational driving system including the spindle motor 21. As the recording processing system, a part for performing EFM modulation and ACIRC encoding at the time of recording to the conventional mini disc, and a part for performing RLL(1-7)PP modulation and RS-LDC encoding at the time of recording to the next-generation MD1 and the next-generation MD2 are provided.

As the reproduction processing system, a part for performing demodulation corresponding to EFM modulation and ACIRC decoding at the time of reproduction from the conventional mini disc, and a part for performing demodulation corresponding to RLL(1-7)PP modulation (i.e., RLL (1-7) demodulation based on data detection using PR(1, 2, 1)ML and Viterbi decoding) and RS-LDC decoding at the time of reproduction form the next-generation MD1 and the next-generation MD2 are provided.

Information detected as reflected light of a laser beam cast on the disc 90 from the optical head 22 (i.e., photocurrent obtained as the photodetector detects the reflected light of the laser beam) is supplied to an RF amplifier 24. The RF amplifier 24 performs current-voltage conversion, amplification, matrix calculation and the like to the inputted detected information and extracts a reproduction RF signal, a tracking error signal TE, a focusing error signal FE, groove information (ADIP information recorded by wobbling of the track on the disc 90) and the like as reproduction information.

In reproduction from the conventional mini disc, the reproduction RF signal obtained at the RF amplifier is passed through a comparator 25 and a PLL circuit 26 and processed by an EFM demodulator 27 and an ACIRC decoder 28. The reproduction RF signal is binarized into an EFM signal string and then EFM-demodulated by the EFM demodulator 27. Moreover, error correction and de-interleave processing are performed to the resulting signal by the ACIRC decoder 28. In the case of audio data, ATRAC compressed data is obtained at this point. In this case, a selector 29 selects a conventional mini disc signal side and the demodulated ATRAC compressed data is outputted to a data buffer 30 as reproduction data from the disc 90. In this case, the compressed data is supplied to the audio processing unit 19 of FIG. 12.

On the other hand, in reproduction from the next-generation MD1 or the next-generation MD2, the reproduction RF signal obtained at the RF amplifier is passed through an A/D converter circuit 31, an equalizer 32, a PLL circuit 33 and a PRML circuit 34 and processed by an RLL(1-7)PP demodulator 35 and an RS-LDC decoder 36. At the RLL(1-7)PP demodulator 35, reproduction data as an RLL(1-7) code string is obtained from the reproduction RF signal on the basis of data detection using PR(1, 2, 1) ML and Viterbi decoding, and RLL(1-7) demodulation processing is performed to this RLL(1-7) code string. Moreover, error correction and de-interleave processing are performed by the RS-LDC decoder 36.

In this case, the selector 29 selects a next-generation MD1/next-generation MD2 side and the demodulated data is outputted to the data buffer 30 as reproduction data from the disc 90. In this case, the demodulated data is supplied to the memory transfer controller 12 of FIG. 12.

The tracking error signal TE and the focusing error signal FE outputted from the RF amplifier 24 are supplied to the servo circuit 37. The groove information is supplied to the ADIP demodulator 38.

The ADIP demodulator 38 limits the band of the groove information using a band-pass filter so as to extract a wobble component and then performs FM demodulation and biphasic demodulation to extract an ADIP address. In the case of the conventional mini disc or the next-generation MD1, the extracted ADIP address, which is absolute address information on the disc, is supplied to a drive controller 41 via an MD address demodulator 39. In the case of the next-generation MD2, the ADIP address is supplied to the drive controller 41 via a next-generation MD2 address decoder 40.

The drive controller 41 executes predetermined control processing based on each ADIP address. The groove information is sent back to the servo circuit 37 for spindle servo control.

The servo circuit 37 generates a spindle error signal for CLV servo control and ZCAV servo control, on the basis of an error signal obtained by integrating a phase difference between the groove information and a reproducing clock (PLL clock at the time of decoding).

The servo circuit 37 also generates various servo control signals (tracking control signal, focusing control signal, thread control signal, spindle control signal and the like), based on the spindle error signal, the tracking error signal and the focusing error signal supplied from the RF amplifier 24 as described above, and a track jump command, an access command and the like from the drive controller 41. The servo circuit 37 outputs these servo control signals to a motor driver 42. That is, the servo circuit 37 performs necessary processing such as phase compensation processing, gain processing and target value setting processing in response to the servo error signal and commands, and thus generates the various servo control signals.

The motor driver 42 generates predetermined servo drive signals based on the servo control signals supplied from the servo circuit 37. The servo drive signals of this case include a biaxial drive signal (focusing direction and tracking direction) for driving the biaxial mechanism, a thread motor driving signal for driving the thread mechanism, and a spindle motor driving signal for driving the spindle motor 21. In response to such servo drive signals, focusing control and tracking control on the disc 90 and CLV control or ZCAV control on the spindle motor 21 are performed.

When the recording operation to the disc 90 is performed, high-density data from the memory transfer controller 12 shown in FIG. 12 or normal ATRAC compressed data from the audio processing unit 19 is supplied.

In recording to the conventional mini disc, a selector 43 is connected to a conventional mini disc side, and an ACIRC encoder and an EFM modulator 45 function. In the case of an audio signal, compressed data from the audio processing unit 19 is interleaved and given an error correction code by the ACIRC encoder 44 and then EFM-modulated by the EFM modulator 45. The EFM-modulated data is supplied to a magnetic head driver 46 via the selector 43 and the magnetic head 23 applies a magnetic field based on the EFM-modulated data to the disc 90, thereby recording the modulated data.

In recording to the next-generation MD1 and the next-generation MD2, the selector 43 is connected to a next-generation MD1/next-generation MD2 side, and an RS-LDC encoder 47 and an RLL(1-7)PP modulator 48 function. In this case, high-density data sent from the memory transfer controller 12 is interleaved and given an error correction code of the RS-LDC system by the RS-LDC encoder 47 and then RLL(1-7)-modulated by the RLL(1-7)PP modulator 48.

The recording data modulated to the RLL(1-7) code string is supplied to the magnetic head driver 46 via the selector 43 and the magnetic head 23 applies a magnetic field based on the modulated data to the disc 90, thereby recording the data.

A laser driver/APC 49 causes the laser diode to execute a laser beam emitting operation in the reproduction and recording as described above. It also performs a so-called APC (automatic laser power control) operation. Specifically, a detector for monitoring the laser power is provided in the optical head 22, though not shown, and its monitor signal is fed back to the laser driver/APC 49. The laser driver/APC 49 compares the current laser power acquired as the monitor signal with predetermined laser power and reflects the difference between them onto a laser driving signal, thereby controlling the laser power outputted from the laser diode so that the laser power is stabilized at a preset value. Values of reproducing laser power and recording laser power are set in a register within the laser driver/APC 49 by the drive controller 41.

On the basis of instructions from the system controller 18, the drive controller 41 controls each structural unit so that the above-described operations (operations of access, various servo, data writing and data reading) are executed. The parts surrounded by chain-dotted lines in FIG. 13 can be constituted as a one-chip circuit.

In the case a data track recording area and an audio track recording area are dividedly set on the disc 90 as shown in FIG. 6, the system controller 18 instructs the drive controller 41 of the medium drive unit 11 to access a preset recording area in accordance with whether data to be recorded or reproduced is on an audio track or a data track.

It is also possible to perform control so that recording of only one of PC data and audio data to the loaded disc 90 is permitted while recording of the other data is prohibited. That is, it is possible to perform control so that PC data and audio data do not exist in a mixed manner.

Thus, the disc drive device 10 described in this embodiment has the above-described structure and therefore can realize compatibility between the conventional mini disc, the next-generation MD1 and the next-generation MD2.

5. Sector Reproduction Processing on Data Track

Reproduction processing and recording processing to the next-generation MD1 and the next-generation MD2 by the above-described disc drive device 10 will now be described. In access to a data area, an instruction to record or reproduce data by each "logical sector (hereinafter referred to as FAT sector)" is given, for example, from the external PC 100 to the system controller 18 of the disc drive device 10 via the USB interface 16. A data cluster, as viewed from the PC 100, is sectioned every 2048 bytes and managed on the basis of the FAT file system in USN ascending order, as shown in FIG. 7. On the other hand, the minimum rewriting unit of a data track on the disc 90 is a next-generation MD cluster having a size of 65,536 bytes, and this next-generation MD cluster is provided with LCN.

The size of a data sector referred to by FAT is smaller than that of a next-generation MD cluster. Therefore, in the disc drive device 10, a user sector referred to by FAT must be converted to a physical ADIP address and reading/writing of data by each data sector referred to by FAT must be converted to reading/writing of data by each next-generation MD cluster, using the cluster buffer memory 13.

Figure 14:
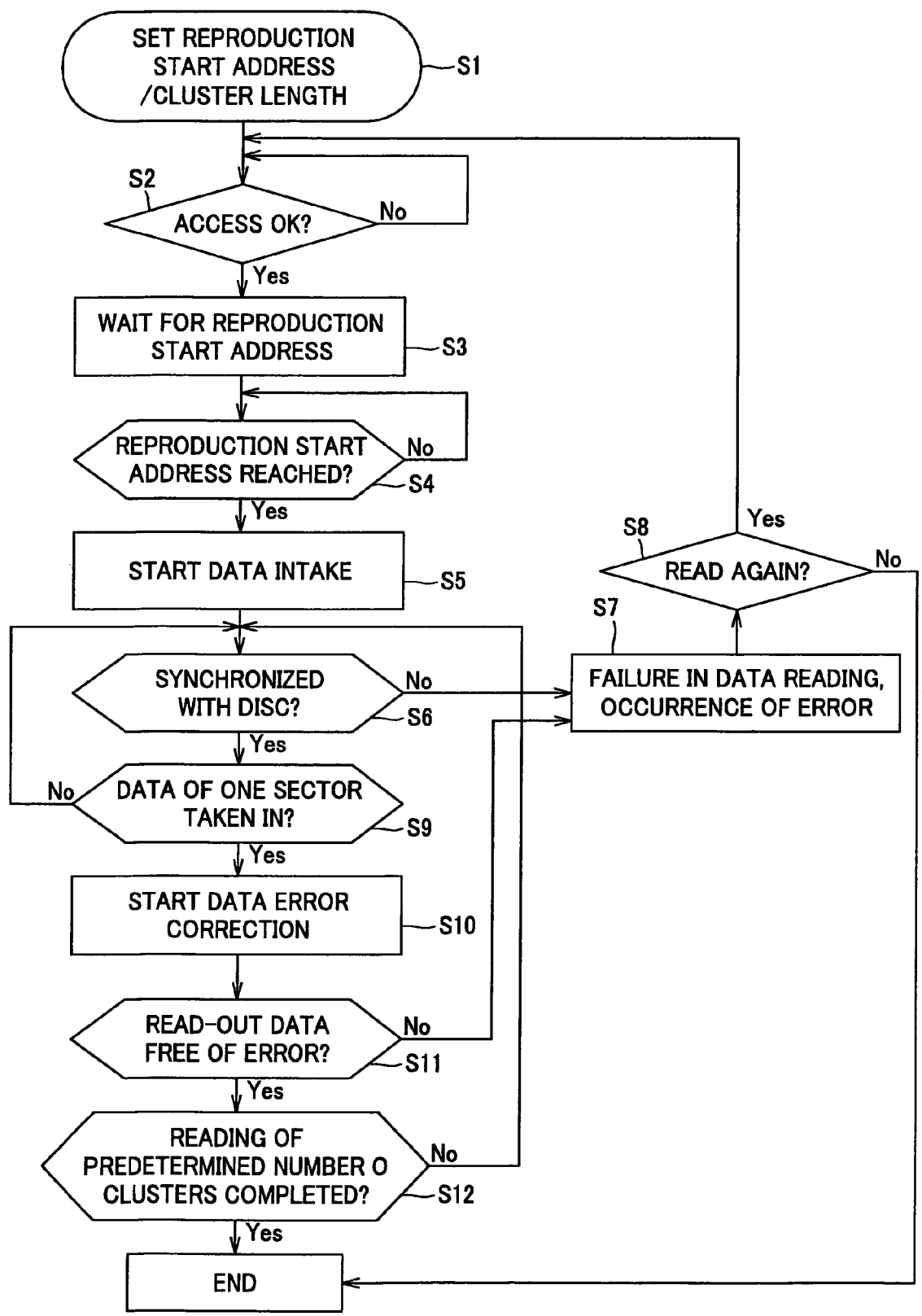
FIG. 14 is a flowchart for explaining sector reproduction processing of the next-generation MD1 and the next-generation MD2 in the disc drive device.

FIG. 14 shows the processing in the system controller 18 of the disc drive device 10 in the case a reading request for a certain FAT sector is sent from the PC 100.

When the system controller 18 receives a reading command for FAT sector #n from the PC 100 via the USB interface 16, the system controller 18 performs processing to find the next-generation MD cluster number of the next-generation MD cluster containing the FAT sector of the designated FAT sector number #n.

First, provisional next-generation MD cluster number u0 is decided. The size of a next-generation MD cluster is 65,536 bytes and the size of a FAT sector is 2048 bytes. Therefore, 32 FAT sectors exist in one next-generation MD cluster. FAT sector number (n) divided by 32 with the remainder rounded down, that is, u0, becomes the provisional next-generation MD cluster number.

Then, with reference to the disc information read into the auxiliary memory 14 from the disc 90, the number of next-generation MD clusters ux other than the clusters for data recording is found. That is, the number of next-generation MD clusters in the secure area is found.

As described above, some of the next-generation MD clusters in the data track are not made public as a data recordable/reproducible area. Therefore, the number of non-public clusters ux is found on the basis of the disc information read into the auxiliary memory 14 in advance. After that, the number of non-public clusters ux is added to next-generation MD cluster number u0, and the result of addition u is used as actual next-generation MD cluster number #u.

As next-generation MD cluster number #u of the next-generation MD cluster containing FAT sector number #n is found, the system controller 18 judges whether or not the next-generation MD cluster of cluster number #u has already been read out from the disc 90 and stored in the cluster buffer memory 13. If not, the system controller 18 reads it from the disc 90.

The system controller 18 finds ADIP address #a from the read-out next-generation MD cluster number #u and thus reading out the next-generation MD cluster from the disc 90.

The next-generation MD cluster might be dividedly recorded in plural part on the disc 90. Therefore, to find the ADIP address where it is recorded, these parts must be sequentially searched. Thus, from the disc information read out into the auxiliary memory 14, the number of next-generation MD clusters p recorded in the leading part of the data track and the leading next-generation MD cluster number px are found.

Since the start address/end address is recorded in the form of ADIP address in each part, the number of next-generation MD clusters p and the leading next-generation MD cluster number px can be found from the ADIP cluster address and the part length. Next, it is judged whether this part includes the next-generation MD cluster of the target cluster number #u or not. If not, the next part is searched. That is, the part indicated by link information of the previously considered part is searched. In this manner, the parts described in the disc information are sequentially searched and the part containing the target next-generation MD cluster is discriminated.

When the part in which the target next-generation MD cluster (#u) is recorded is found, the difference between next-generation MD cluster number px recorded at the leading end of this part and the target next-generation MD cluster number #u is found and an offset from the leading end of the part to the target next-generation MD cluster (#u) is thus acquired.

In this case, since two next-generation MD clusters are written in one ADIP cluster, this offset may be divided by 2 and thus converted to an ADIP address offset f (where f (u−px)/2).

However, if a fraction of 0.5 is generated, writing starts at a central part of the cluster f. Finally, the offset f is added to the cluster address part at the leading ADIP address of this part, that is, at the start address of the part, and ADIP address #a of the recording destination to which the next-generation MD cluster (#u) is to be actually written can be thus found. The processing up to this point is equivalent to the processing to set the reproduction start address and the cluster length at step S1. In this case, it is assumed that discrimination of the conventional mini disc, the next-generation MD1 or the next-generation MD2 has already been completed.

As ADIP address #a is found, the system controller 18 instructs the medium drive unit 11 to access ADIP address #a. Therefore, the medium drive unit 11 executes access to ADIP address #a under the control of the drive controller 41.

The system controller 18 waits for completion of the access at step S2. On completion of the access, the system controller 18 at step S3 waits for the optical head 22 to read the target reproduction start address. After confirming at step S4 that the optical head 22 has reached the reproduction start address, the system controller 18 at step S5 instructs the medium drive unit 11 to start data reading of one cluster of the next-generation MD clusters.

In response to this, the medium drive unit 11 starts data reading from the disc 90 under the control of the drive controller 41. Data readout by the reproducing system including the optical head 22, the RF amplifier 24, the RLL(1-7)PP demodulator 35 and the RS-LDC decoder 36 is outputted and supplied to the memory transfer controller 12.

At this point, the system controller 18 at step S6 judges whether synchronization with the disc 90 is realized or not. If synchronization with the disc 90 is not realized, the system controller 18 at step S7 generates a signal indicating occurrence of a data reading error. If it is determined at step S8 that reading is to be executed again, the processes from step S2 are repeated.

When the data of one cluster is acquired, the system controller 18 at step S10 starts error correction of the acquired data. If the acquired data has an error at step S11, the system controller 18 returns to step S7 to generate a signal indicating occurrence of a data reading error. If the acquired data has no error, the system controller 18 at step S12 judges whether a predetermined cluster has been acquired or not. If the predetermined cluster has been acquired, the series of processing ends and the system controller 18 waits for the medium drive unit 11 to complete the reading operation and causes the data read out and supplied to the memory transfer controller 12 to be stored into the cluster buffer memory 13. If the predetermined cluster has not been acquired, the processes from step S6 are repeated.

The data of one cluster of the next-generation MD clusters read into the cluster buffer memory 13 contains plural FAT sectors. Therefore, the data storage position of the requested FAT sector is found from these, and the data of the one FAT sector (2048 bytes) is sent to the external PC 100 from the USB interface 15. Specifically, the system controller 18 finds, from the requested FAT sector number #n, byte offset #b in the next-generation MD cluster containing this sector. Then, the system controller 18 causes the data of the one FAT sector (2048 bytes) from the position of byte offset #b in the cluster buffer memory 13 to be read out, and transfers the read-out data to the PC 100 via the USB interface 15.

By the above-described processing, reading and transfer of a next-generation MD sector corresponding to a reading request for one FAT sector from the PC 100 can be realized.

6. Sector Writing Processing on Data Track

Figure 15:
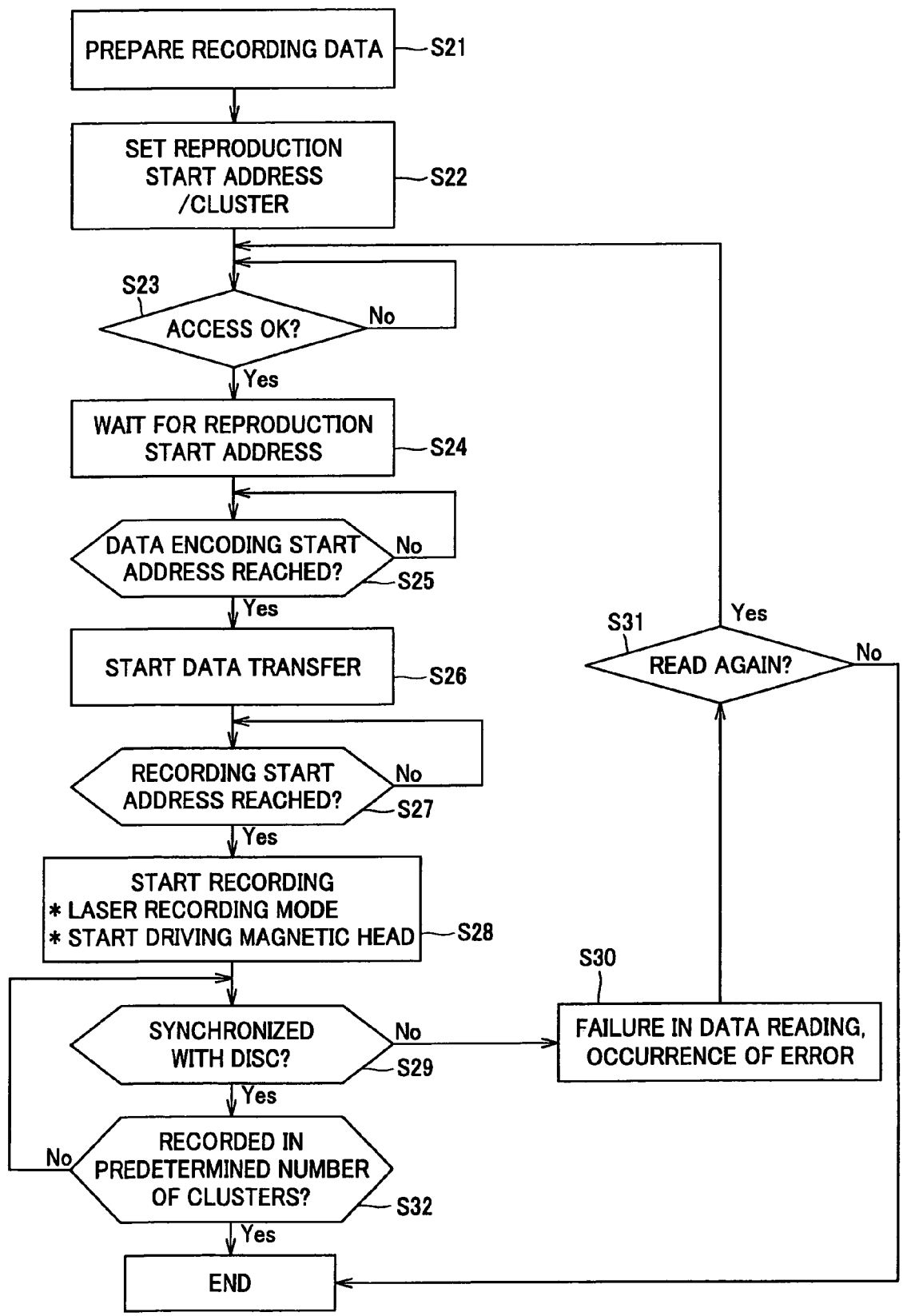
FIG. 15 is a flowchart for explaining sector recording processing of the next-generation MD1 and the next-generation MD2 in the disc drive device.

The processing in the system controller 18 of the disc drive device 10 in the case a writing request for a certain FAT sector is sent from the PC 100 will now be described with reference to FIG. 15.

When the system controller 18 receives a writing command for FAT sector #n from the PC 100 via the USB interface 16, the system controller 18 finds the next-generation MD cluster number of the next-generation MD cluster containing the FAT sector of the designated FAT sector number #n as described above.

As next-generation MD cluster number #u of the next-generation MD cluster containing FAT sector number #n is found, the system controller 18 judges whether or not the next-generation MD cluster of the found cluster number #u has already been read out from the disc 90 and stored in the cluster buffer memory 13. If not, the system controller 18 performs processing to read out the next-generation MD cluster of cluster number u from the disc 90. That is, the system controller 18 instructs the medium drive unit 11 to read out the next-generation MD cluster of cluster number #u and to store the read-out next-generation MD cluster into the cluster buffer memory 13.

Moreover, the system controller 18 finds, from FAT sector number #n of the writing request, byte offset #b in the next-generation MD cluster containing this sector, in the above-described manner. Then, the system controller 18 receives data of 2048 bytes as writing data to the FAT sector (#n) transferred from the PC 100 via the USB interface 15, and start writing the data of one FAT sector (2048 bytes) at the position of byte offset #b in the cluster buffer memory 13.

Therefore, of the data of the next-generation MD cluster (#u) stored in the cluster buffer memory 13, only the FAT sector (#n) designated by the PC 100 is rewritten. Thus, the system controller 18 performs processing to write the next-generation MD cluster (#u) stored in the cluster buffer memory 13 to the disc 90. The processing up to this point is a recording data preparation process of step S21. In this case, too, it is assumed that discrimination of the medium has already been completed by another technique.

Next, the system controller 18 at step S22 sets ADIP address #a of the recording start position from next-generation MD cluster number #u for writing. As ADIP address #a is set, the system controller 18 instructs the medium drive unit 11 to access ADIP address #a. Therefore, the medium drive unit 11 executes access to ADIP address #a under the control of the drive controller 41.

After confirming completion of the access at step S23, the system controller 18 at step S24 waits for the optical head 22 to reach the target reproduction start address. As it is confirmed at step S25 that the optical head has reached the encode address of the data, the system controller 18 at step S26 instructs the memory transfer controller 12 to start transferring the data of the next-generation MD cluster (#u) stored in the cluster buffer memory 13 to the medium drive unit 11.

Then, after confirming at step S27 that the recording start address has been reached, the system controller 18 at step S28 instructs the medium drive unit 11 to write the data of this next-generation MD cluster to the disc 90. In response to this, the medium drive unit 11 starts data writing to the disc 90 under the control of the drive controller 41. That is, the data transferred from the memory transfer controller 12 is recorded by the recording system including the RS-LDC encoder 47, the RLL(1-7)PP modulator 48, the magnetic head driver 46, the magnetic head 23 and the optical head 22.

At this point, the system controller 18 at step S29 judges whether synchronization with the disc 90 is realized or not. If synchronization with the disc 90 is not realized, the system controller 18 at step S30 generates a signal indicating occurrence of a data reading error. If it is judged at step S31 that reading is to be executed again, the processes from step S2 are repeated.

When data of one cluster is acquired, the system controller 18 at step S32 judges whether a predetermined cluster has been acquired or not. If the predetermined cluster has been acquired, the series of processing ends.

By the above-described processing, writing of FAT sector data to the disc 90 corresponding to a writing request for one FAT sector from the PC 100 can be realized. In short, writing of data by each FAT sector is executed as rewriting of data by each next-generation MD cluster to the disc 90.

7. Relation Between ADIP Address and Address of Address Unit

Figure 16:
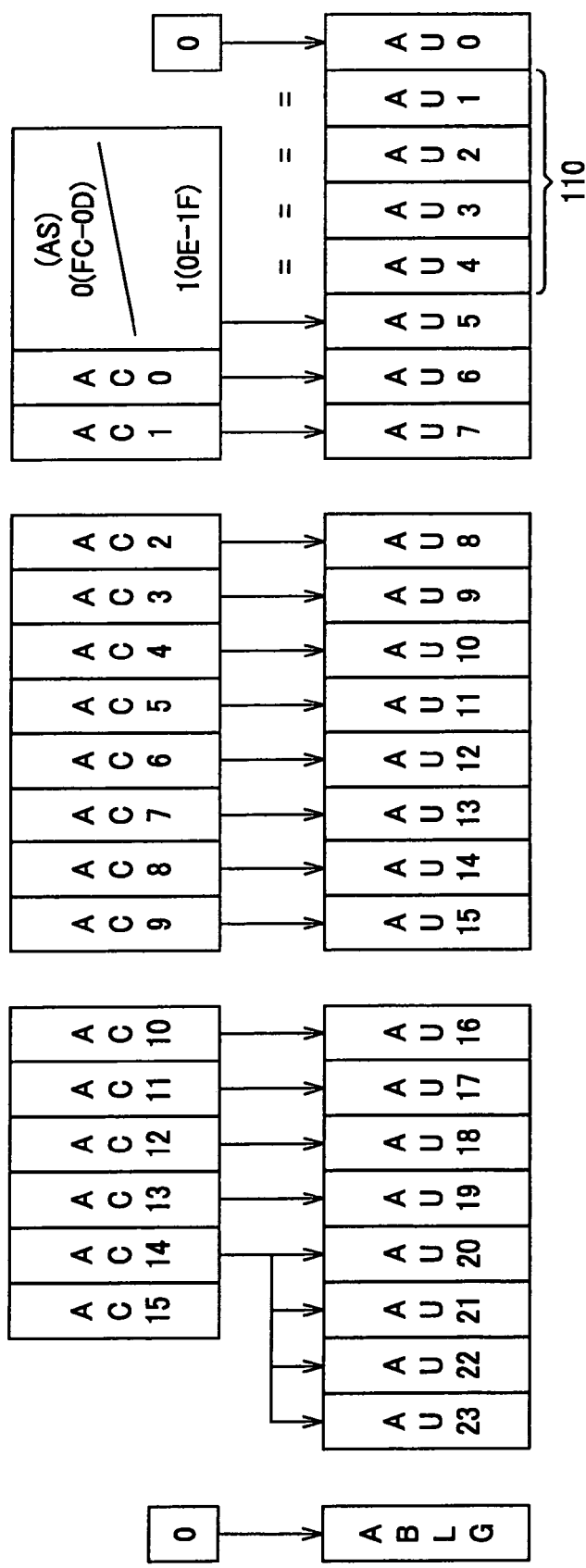
FIG. 16 is a view for explaining the relation between an ADIP address and an address unit of the next-generation MD1 described as a specific example of the present invention.
Figure 17:
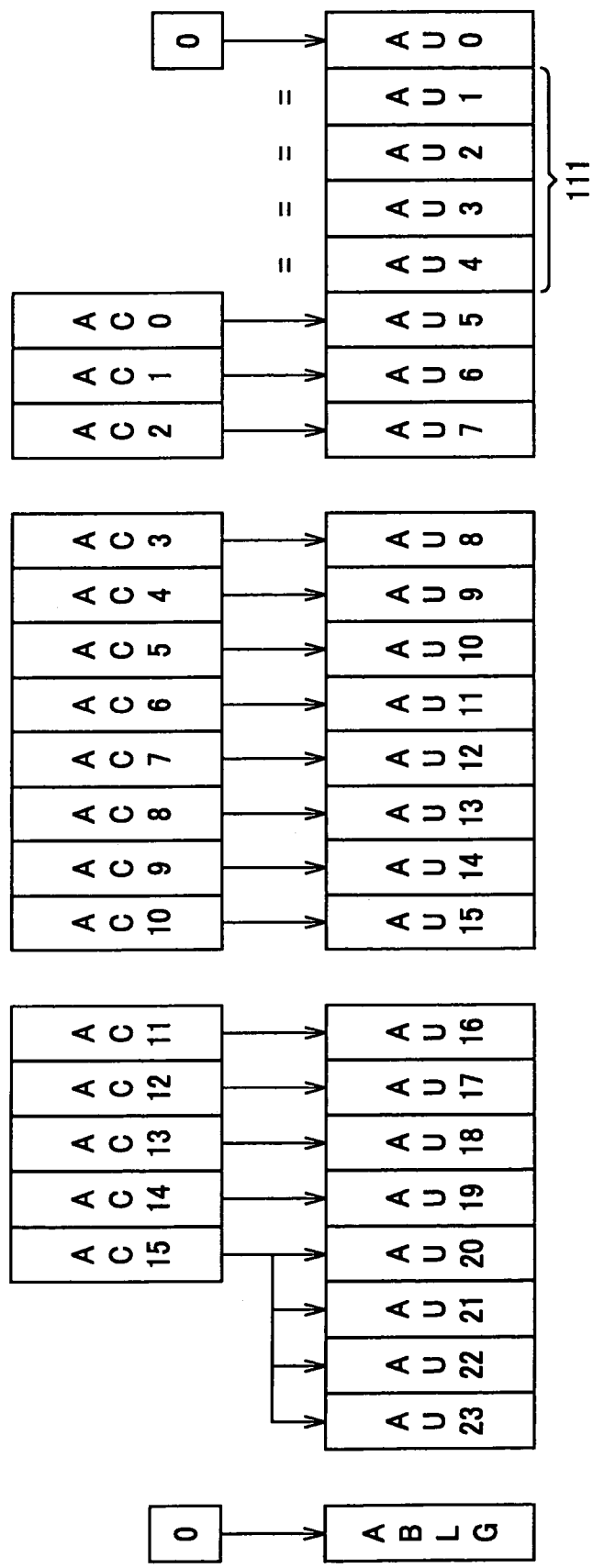
FIG. 17 is a view for explaining the relation between an ADIP address and an address unit of the next-generation MD2 described as a specific example of the present invention.

The relation between the ADIP address and the address of the address unit will now be described with reference to FIGS. 16 and 17. In these FIGS. 16 and 17, AC represents the cluster address (cluster number) based on the above-described ADIP, which is the physical address on the disc, and AU represents the address of the above-described address unit for accessing data. FIG. 16 shows the case of the next-generation MD1. FIG. 17 shows the case of the next-generation MD2.

First, in FIG. 16, since the next-generation MD1 uses the ADIP of the conventional MD, 16 bits of AC0 to AC15 are used as the cluster addresses (cluster number).

In FIG. 16, AC represents the cluster address and AD represents the address sector. In consideration of a recording capacity of approximately 80 minutes as an actually used MD, it suffices to provide a cluster address of approximately 12 bits. AC0 to AC14 of this ADIP cluster address are associated with address bits AU6 to AU20 of the address unit.

As the ADIP address of the conventional MD, a sector address of 8 bits is arranged on the lower side of the cluster address. On the basis of this sector address, 0/1 expressing the sector address (FC to 0D) of the former-half cluster and the sector address (0E to 1F) of the latter-half cluster shown in FIG. 9 is associated with address bit AU5 of the address unit.

That is, this address bit AU5 has a value 0 in the case of the former-half cluster (sectors FC to 0D) and 1 in the case of the latter-half cluster (sectors 0E to 1F). This address bit AU5 of the address unit becomes the least significant bit of the address of the above-described recording unit, and AU5 to AU20 represent the recording block number or recording block address. To a part 110 of 4 bits of address bits AU4 to AU1 below address bit AU5, bits generated by a 4-bit counter are allocated. That is, 4 bits for representing respective parts in the case where the above-described one recording block of FIG. 9 is equally divided by 16 are represented by address bits AU4 to AU1, respectively.

More specifically, the parts obtained equally dividing 496 frames of frame 10 to frame 505 as a data area, of 512 frames of one recording block of FIG. 9, by 16, are accessed with AU4 to AU1, respectively.

The least significant bit AU0 constantly has a value 0. In this specific embodiment, the number of bits of the address unit is 25, and the value (code) of AC14 of the ADIP address is substituted into AU21 to AU23, which are above AU20. Alternatively, the value of AU20 of the address unit may be substituted into AU21 to AU23. Moreover, the value (code) of AC14 may be substituted into AU20, and the value (code) of AC 15 may be substituted into AU21 to AU23.

In consideration of a disc having plural recording areas for land/groove recording or two-spiral track recording, or a double-layer disc, an address bit ABLG for identifying these recording areas is provided. Thus, AU0 to AU23 and ABLG constitute an address of 25 bits.

In the leading three frames of 31 frames constituting address units obtained by equally dividing 496 frames of FIG. 9 by 16, the above-described address unit number of 25 bits is recorded. This 25-bit address unit number may also be written into, for example, a part of the BIS area of FIG. 3 in a predetermined cycle (for example, a cycle of 31 frames).

Figure 20:
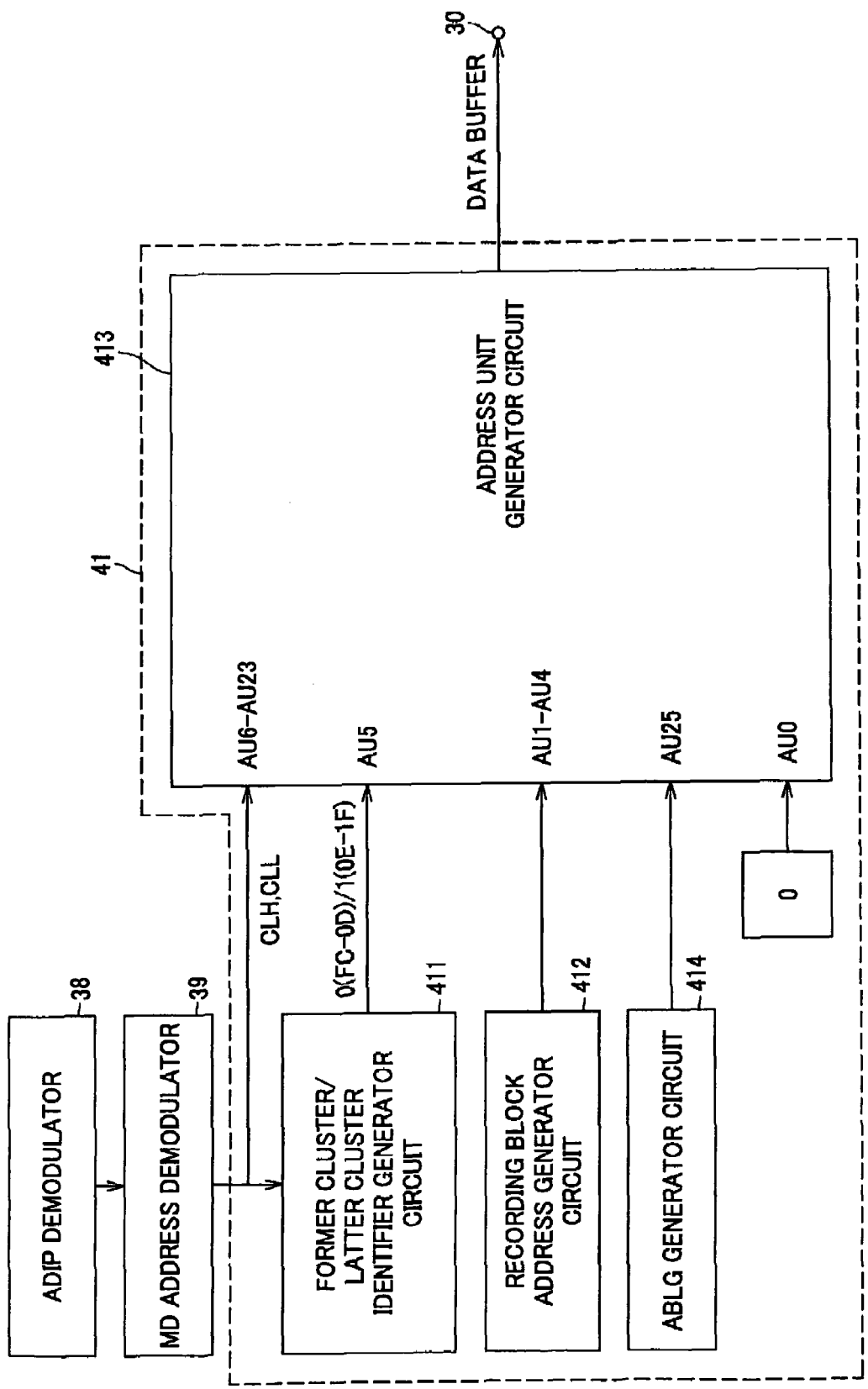
FIG. 20 is a circuit diagram for realizing address unit conversion according to the present invention.

FIG. 20 shows the structure for realizing conversion from the cluster address to the unit address in the next-generation MD1. The numbers provided in FIG. 20 partly correspond to the numbers in FIG. 13.

The ADIP address demodulated by the ADIP demodulator 38 is converted by the MD address demodulator 39 to an address of 20 bits in total including cluster H, cluster L and sector. For the 16 bits (AC15 to AC0) of cluster H and cluster L, an identifier is generated by a former cluster/latter cluster identifier generator circuit 411 and registered to AU5 by an address unit generator circuit 413.

Addresses generated for respective recording units by a recording block address generator circuit 412 are registered to AU1 to AU4 by the address unit generator circuit 413. The ADIP address demodulated by the ADIP demodulator 38 is duplicated to AC8 to AC23 by the MD address demodulator 39, and cluster H and cluster L are partly duplicated to AC8 to AC23 by the address unit generator circuit 413.

0 is registered to AU0 and the address bit ABLG generated by the address unit generator circuit 413 is registered to AU25. The address unit number generated by the address unit generator circuit 413 is transmitted to the data buffer 30, then modulated in a predetermined manner, and recorded for plural times into the leading three frames of 31 frames constituting each address unit.

In the specific example shown in FIG. 16, a disc having one recording area is used and ABLG is 0. However, in the case of a disc having two recording areas, 1 or 0 is given in accordance with the individual recording areas. In the case of a disc having three or more recording areas, two or more address bits for identifying the recording areas may be provided.

Next, in the case of the next-generation MD2 shown in FIG. 17, since an ADIP cluster includes 16 sectors, AC0 to AC 15 of the cluster address (cluster number) of the ADIP address are associated with AU5 to AU20 of the address unit. Also in this case, address bit AU5 of the address unit becomes the least significant bit of the address of the above-described recording unit, and AU5 to AU20 represent the recording block number or recording block address. To a part 110 of 4 bits of address bits AU4 to AU1 below address bit AU5, bits generated by a 4-bit counter are allocated. The least significant bit AU0 constantly has a value 0. Moreover, the value (code) of AC15 of the ADIP address is substituted into AU21 to AU23, which are above AU20.

Also in this specific example shown in FIG. 17, similar to the case of FIG. 16, ABLG is constantly 0 corresponding to a disc having one recording area. However, in the case of a disc having two recording areas, 1 or 0 is given in accordance with the individual recording areas. In the case of a disc having three or more recording areas, two or more address bits for identifying the recording areas may be provided.

The specific circuit in the case of FIG. 17 is the same as that of FIG. 20 except for the former cluster/latter cluster identifier generator circuit 411, which is not provided in this case.

According to this embodiment of the present invention, the next-generation DM1 enables data access using the 25-bit address (AU0 to AU25) extended for handling an increased data volume while using the same physical address format as that of the conventional MD. The next-generation MD1 thus has excellent compatibility and enables access to an increased volume of data without causing any inconvenience. Moreover, between the next-generation MD1 and the next-generation MD2, excellent data compatibility is realized as the 25-bit address (AU0 to AU25) of the address unit can be equally handled.

8. Scrambling Processing for Each Sector (Logical Sector) of Data

Figure 18:
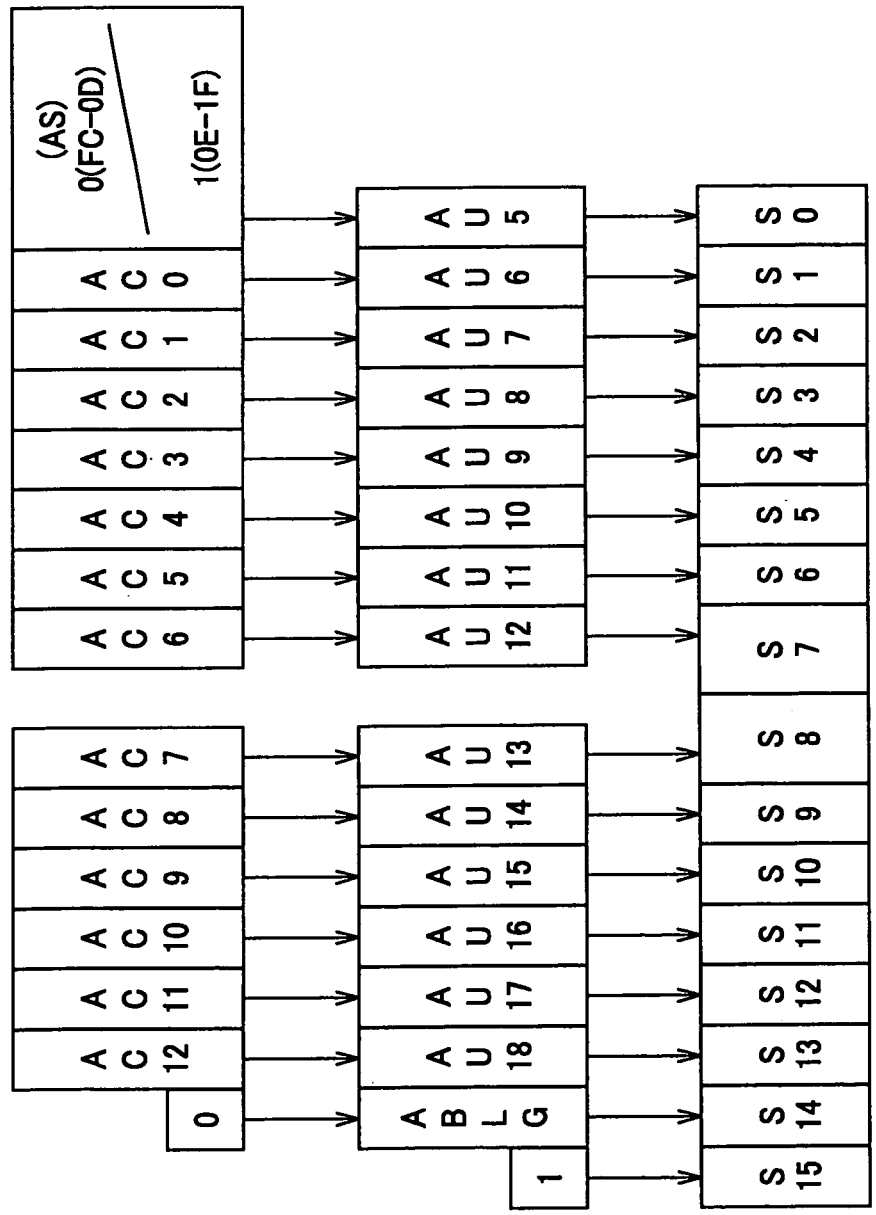
FIG. 18 is a view for explaining scrambling processing of a logical sector of the next-generation MD1 described as a specific example of the present invention.
Figure 19:
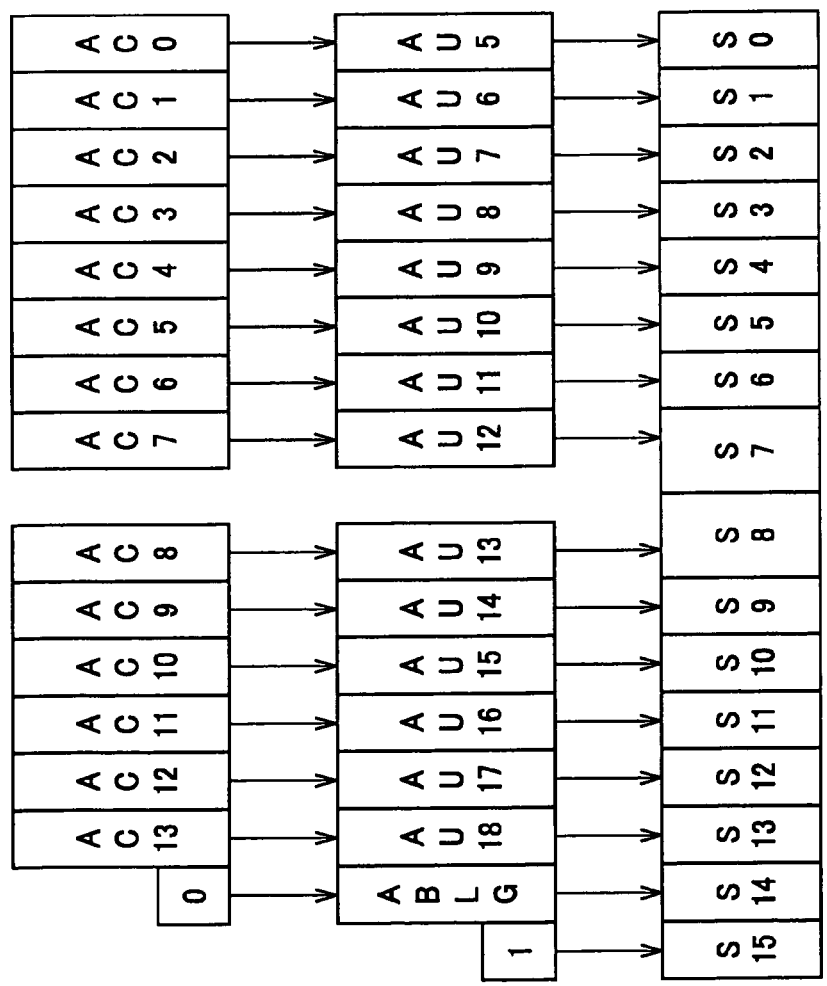
FIG. 19 is a view for explaining scrambling processing of a logical sector of the next-generation MD2 described as a specific example of the present invention.

Scrambling processing for each sector (logical sector) of data will now be described with reference to FIGS. 18 and 19. In FIGS. 18 and 19, AC represents the cluster address (cluster number) based on the above-described ADIP, which is the physical address on the disc. AU represents the address of the address unit for accessing data, and s represents each bit of a shift register for generating a pseudo-random number. FIG. 18 shows the case of the next-generation MD1. FIG. 19 shows the case of the next-generation MD2.

In the description of FIG. 2, 2052 bytes, obtained by adding 4-byte EDC (error detection code) to every 2048 bytes of user data supplied from a host application or the like, is handled as one sector (data sector or logical sector), and 32 sectors from sector 0 to sector 31 are grouped as a block consisting of 304 columns and 216 rows. For data of 2052 bytes of each sector, a pseudo-random number is generated using the ADIP address as a seed or initial value of random number, and exclusive OR (EX-OR) with this pseudo-random number is taken to perform scrambling processing. The pseudo-random number may be generated from, for example, a so-called maximum length sequence using a generating polynomial, and the seed of random number is loaded as an initial value to a shift register for generating the maximum length sequence. The seed of random number may be, for example, the cluster address (cluster number) of the ADIP address but it is not limited to this number. However, in the embodiment of the present invention, in consideration of a disc having plural recording areas for land/groove recording or two-spiral track recording, or a double-layer disc, identification information of these recording areas, for example, address bit ABLG for land/groove identification in FIGS. 18 and 19, may be used as a part of the seed of random number.

The data unit of 2048 bytes is called user data sector, and the data unit of 2052 bytes with the EDC added thereto is called data sector.

Specifically, first, in the case of the next-generation MD1 shown in FIG. 18, AC0 to AC12 of the cluster address of ADIP are associated with AU6 to AU18 of the address unit. A high-order digit of the sector address, which is 0 in the case of the former-half cluster (FC to 0D) and is 1 in the case of the latter-half cluster (0E to 1F), is associated with AU5. The address bit ABLG for identifying the recording areas of the disc having plural recording areas for land/groove recording or the like is set at 0. These bits of AU5 to AU18 and ABLG are associated with 15 bits s0 to s14 from the lower side in the 16-bit shift register for generating a pseudo-random number. Considering that a pseudo-random number cannot be generated if all the bits of the shift register become 0, 1 is associated with the most significant bit s15. The values of these bits AU5 to AU18 and ABLG and the value 1 for the most significant bit are loaded to the bits s0 to s15 of the 16-bit shift register every time the data sector of FIG. 2 starts. This is used as an initial value and a pseudo-random number is generated. Then, exclusive OR (Ex-OR) of the generated pseudo-random number and each data of the data sector is taken.

Next, in the case of the next-generation MD2 shown in FIG. 19, AC0 to AC 13 of the cluster address of ADIP are associated with AU5 to AU18 of the address unit. The address bit ABLG for identifying the recording areas of the disc having plural recording areas for land/groove recording or the like is set at 0. These bits of AU5 to AU18 and ABLG are associated with 15 bits s0 to s14 from the lower side in the 16-bit shift register for generating a pseudo-random number. Considering that a pseudo-random number cannot be generated if all the bits of the shift register become 0, 1 is associated with the most significant bit s15. The values of these bits AU5 to AU18 and ABLG and the value 1 for the most significant bit are loaded to the bits s0 to s15 of the 16-bit shift register every time the data sector of FIG. 2 starts. This is used as an initial value and a pseudo-random number is generated. Then, exclusive OR (Ex-OR) of the generated pseudo-random number and each data of the data sector is taken.

In the above-described specific examples, 16 bits obtained by connecting the cluster address (recording block number), the address bit ABLG for recording area identification and 1 of the most significant position are uses as a seed of random number, and it is loaded as an initial value to the 16-bit shift register for pseudo-random number generation every time the data sector of FIG. 2 starts, thus generating a pseudo-random number. However, the address is not limited to the cluster address (recording block number) and may include, for example, a part of the address below AU5. The timing at which the seed of random number is loaded is not limited, either. In the case of a disc having two recording areas, 1 or 0 is given in accordance with the individual recording areas. In the case of a disc having three or more recording areas, two or more address bits for identifying the recording areas may be provided.

According to the embodiment of the present invention, as scrambling processing is performed to digital data in which a bias is easily generated because of the regularity of the data or the like, randomness is realized and the recording/reproducing efficiency is improved. Moreover, even in the case of a disc having plural recording areas such as a land/groove recording disc or a multilayer disc and thus having the same address on the neighboring tracks, since the seed for generation of random number differs between the recording areas, no same random number is generated and different scrambling processing is performed. Therefore, interference between tracks can be reduced.

It should be understood by those ordinarily skilled in the art that the invention is not limited to the above-described embodiment described with reference to the drawings, but various modifications, alternative constructions or equivalents can be implemented without departing from the scope and spirit of the present invention as set forth and defined by the appended claims.

INDUSTRIAL APPLICABILITY

In the present invention, the word length of first address information is set to be longer than the word length of second address information and a part of the first address information is duplicated to the second address information. An address is added to each high-density block and converted to the second address information. Thus, data can be recorded in plural recording formats to a recording medium on which the first address information is modulated in a predetermined manner and recorded in advance, and a higher-density data volume can be handled without causing any inconvenience while using the existing recording format.

What is claimed is:

1. A disc recording/reproducing device adapted for, with respect to a disc on which a unit cluster having a predetermined number 2N (where N is a positive integer) of sectors as a set is formed and on which a sector address corresponding to each sector and a cluster address corresponding each cluster are modulated in a predetermined manner and recorded in advance, performing recording and reproduction using N sectors as a unit, which is obtained by bisecting the unit cluster, the disc recording/reproducing device comprising:

a reproduction unit configured to reproduce the cluster address and the sector address modulated in the predetermined manner and recorded in advance, from the disc;

an identifier generation unit configured to generate an identifier that identifies the former N sectors or the latter N sectors obtained by bisecting the unit cluster, as an N-sector recording unit used for recording data;

a blocking and recording unit configured to block inputted data into plural blocks and record the blocked data within the N-sector recording unit;

an address generation unit configured to generate an address corresponding to the plural blocks each that are formed in the N-sector recording unit; and a conversion unit configured to convert the cluster address and the sector address reproduced by the reproduction unit to an address unit including the identifier generated by the identifier generation unit, the address generated by the address generation unit and a recording block address generated on the basis of the cluster address, wherein the address unit obtained by conversion by the conversion unit is recorded for the plural blocks each, by the recording means.

2. The disc recording/reproducing device as claimed in claim 1, further comprising a generation unit configured to generate an identifier that identifies a recording area when the disc has plural recording areas, wherein the identifier generated by the generation unit is added to the address unit by the conversion unit and thus recorded.

3. The disc recording/reproducing device is claimed in claim 2, wherein the identifier generated by the generation unit has a fixed value when the disc has a single recording area.

* * * * *